US011012557B2

(12) United States Patent
Valentine et al.

(10) Patent No.: US 11,012,557 B2
(45) Date of Patent: May 18, 2021

(54) SYSTEMS AND METHODS FOR CLIENT RELATION MANAGEMENT

(71) Applicant: Lucency Technologies, Inc., Lehi, UT (US)

(72) Inventors: Neil Valentine, Lehi, UT (US); Andrew Hill, Lehi, UT (US); Ryan McCoy, Lehi, UT (US); Daniel Nelson, Lehi, UT (US)

(73) Assignee: Lucency Technologies, Inc., Lehi, UT (US)

( * ) Notice: Subject to any disclaimer, the term of this patent is extended or adjusted under 35 U.S.C. 154(b) by 67 days.

(21) Appl. No.: 16/384,801

(22) Filed: Apr. 15, 2019

(65) Prior Publication Data

US 2019/0320065 A1 Oct. 17, 2019

Related U.S. Application Data

(60) Provisional application No. 62/657,717, filed on Apr. 13, 2018, provisional application No. 62/703,855, (Continued)

(51) Int. Cl.
*H04L 29/08* (2006.01)
*H04M 3/42* (2006.01)
(Continued)

(52) U.S. Cl.
CPC .... *H04M 3/42102* (2013.01); *G06F 16/9535* (2019.01); *G06Q 10/06311* (2013.01);
(Continued)

(58) Field of Classification Search
None
See application file for complete search history.

(56) References Cited

U.S. PATENT DOCUMENTS

| 7,006,607 | B2 | 2/2006 | Garcia |
| 8,238,540 | B1 | 8/2012 | Duva |
| 8,874,102 | B2 | 10/2014 | Fisher |
| 2004/0107137 | A1 | 6/2004 | Skinner |

(Continued)

FOREIGN PATENT DOCUMENTS

WO WO2019200408 10/2019

OTHER PUBLICATIONS

PCT/US2019/027555, Oct. 19, 2019, International Search Report and Written Opinion.

*Primary Examiner* — Nafiz E Hoque
(74) *Attorney, Agent, or Firm* — Ray Quinney & Nebeker P.C.; Paul N. Taylor

(57) ABSTRACT

Systems, methods, computer systems, and computer-readable code for implementing methods for client relation management in which fewer call-in numbers need to be maintained. A method for client relation management preserves a more-complete record of online and offline interactions of a customer with systems provided by a plurality of service providers. A session identifier (SID) is associated with a customer interaction of the customer with a website provided by a first service provider. Website interaction information is received from the first service provider and is associated with the SID. Information associated with an incoming call from the customer at a call-in number at a call center maintained by a second service provider is used to associate the incoming call with the SID, creating a record of an offline interaction between the customer and an agent of the call center. The record of the offline interaction is associated with the SID.

23 Claims, 12 Drawing Sheets

Related U.S. Application Data filed on Jul. 26, 2018, provisional application No. 62/746,354, filed on Oct. 16, 2018, provisional application No. 62/780,035, filed on Dec. 14, 2018.

(51) Int. Cl.

| | | |
|---|---|---|
| *G06F 16/9535* | (2019.01) | |
| *G06Q 30/02* | (2012.01) | |
| *G06Q 10/06* | (2012.01) | |
| *H04M 3/523* | (2006.01) | |
| *H04M 3/51* | (2006.01) | |
| *G06Q 30/00* | (2012.01) | |

(52) U.S. Cl.
CPC ......... *G06Q 30/01* (2013.01); *G06Q 30/0277* (2013.01); *H04L 67/22* (2013.01); *H04M 3/5183* (2013.01); *H04M 3/523* (2013.01); *H04M 2242/30* (2013.01)

(56) References Cited

U.S. PATENT DOCUMENTS

| | | | |
|---|---|---|---|
| 2004/0117383 A1 | 6/2004 | Lee | |
| 2007/0124290 A1* | 5/2007 | Swanson | G06Q 30/02 |
| 2009/0150213 A1 | 6/2009 | Cyr | |
| 2009/0262914 A1 | 10/2009 | Khouri | |
| 2011/0066498 A1* | 3/2011 | Wojcicki | G06Q 30/0257 |
| | | | 705/14.55 |
| 2011/0125593 A1 | 5/2011 | Wright | |
| 2011/0158398 A1 | 6/2011 | Kannan | |
| 2012/0300916 A1* | 11/2012 | Woicke | H04M 3/5235 |
| | | | 379/201.12 |
| 2015/0066633 A1* | 3/2015 | Agrawal | G06Q 30/0246 |
| | | | 705/14.45 |
| 2015/0120438 A1 | 4/2015 | Gilberd | |
| 2015/0281450 A1* | 10/2015 | Shapiro | H04M 3/5166 |
| | | | 379/265.09 |
| 2015/0350435 A1 | 12/2015 | Connolly | |
| 2016/0100058 A1* | 4/2016 | Nelson | H04M 3/5191 |
| | | | 379/265.09 |
| 2017/0104874 A1* | 4/2017 | Yi | H04M 3/5175 |

\* cited by examiner

SYSTEMS AND METHODS FOR CLIENT RELATION MANAGEMENT

CROSS-REFERENCE TO RELATED APPLICATIONS

This application claims the benefit of U.S. Provisional Application No. 62/657,717 filed Apr. 13, 2018, of U.S. Provisional Application No. 62/703,855 filed Jul. 26, 2018, of U.S. Provisional Application No. 62/746,354 filed Oct. 16, 2018, and of U.S. Provisional Application No. 62/780,035 filed Dec. 14, 2018, each of which is incorporated herein by reference for all it discloses. This application is related to U.S. patent application Ser. No. 14/538,685, now published as U.S. Patent Application Publication No. 2016/0100058 A1, which is incorporated herein by reference for all it discloses.

BACKGROUND OF THE INVENTION

1. Field of the Invention

The present invention relates to management of client relations, and more particularly to systems and methods for using information gathered and obtained about clients and potential clients to manage interactions with the clients in all stages of interaction with the clients.

2. Background and Related Art

Most companies employ analytics to track the success of their online marketing campaigns. A key metric used in analytics is the conversion rate. The conversion rate of a marketing campaign is typically generated based on the number of advertisements selected and the number of sales that resulted from these selections. In a typical online scenario, a company pays an advertising service, such as Google AdWords, to present advertisements within a website based on one or more attributes of the user visiting the site or the manner in which the user reached the site (e.g., keywords used in a search, referring site, search history, etc.).

When a user selects an advertisement, the user is typically routed to the company's website where the user can complete a purchase. When routing the user to the company's website, the referring website typically provides information that can be used to identify the advertisement that the user selected. Then, if the user completes a purchase on the company's website, the purchase can be linked to the advertisement that the user selected indicating that a "conversion" of the advertisement has occurred. Similarly, if the user does not complete a purchase on the company's website, the failure to convert the selection of the advertisement into a sale can be recorded. By tracking the number of times an advertisement is selected and the number of times that these selections lead to a sale, the company can generate the conversion rate of the advertising campaign. A higher conversion rate of an advertisement campaign would therefore indicate that the company should spend more on the campaign. This is one example of how the success of an advertising campaign can be measured, although other techniques can also be employed.

Although this process of linking a purchase to the selection of an advertisement can be easily accomplished when the user completes the purchase online, the same is not true when the user completes the purchase offline. For example, many websites provide a phone number (in the U.S., a direct inward dial (DID) number or a toll free number (TFN), or the equivalent in other countries, collectively a "phone number") that a user can call to complete a purchase by speaking with a representative. If the user, after having selected an advertisement to reach the company's website, decides to complete the purchase over the phone, there will be no direct link between the online selection of the advertisement and the offline purchase.

To address this issue, a technique known as call tracking has been developed. To implement call tracking, a company will employ tracking phone numbers to enable a phone call to be associated with a previous selection of an advertisement. For example, when a user selects an advertisement that routes the user to the company's website, the website can be customized to include a particular phone number that can be uniquely associated with that user for a period of time. Then, if a phone call is received at the particular phone number, the company can know that it was likely the user that made the call since the particular phone number would not have been displayed to other users during the period of time. If the user then makes a purchase over the phone, the purchase can be linked back to the advertisement that the user originally selected. The use of tracking phone numbers in this manner therefore provides a link between the online and offline actions. This link can allow a company to track the conversion rate of its campaigns even though some conversions may occur over the phone.

Problems may occur with such systems when customers delay between a time when the particular phone number is displayed on the website and when the customer calls the number. This may occur, for example, when the customer is multi-tasking and in switching between tasks delays calling in to the displayed phone number. As another example, the customer may be short on time at the moment, and may write down the phone number to call in later for assistance or to complete a transaction. The reasons why a customer may delay in calling in to the displayed phone number are innumerable. Regardless, such delay is problematic for the company given the cost associated with maintaining a pool of unique phone numbers for use in call tracking systems. Because of such cost, the company typically wishes to reassign the phone number for use with more-active customers (at least at busy times), as most instances where a call is not received in short proximity to when the number is displayed are a result of disinterest. Accordingly, most companies reassign assigned phone numbers after a reasonable period of inactivity, despite the loss of the ability to associate some incoming calls with certain advertising efforts, as a cost of doing business.

Additional problems are inherent in the costs of maintaining call-in systems. As may be appreciated, the employment of call-in center staff represents a significant cost of doing business in many industries. In some instances and due to the costs involved, a business may elect not to provide call center services or may elect to provide only minimal call-in services. Other businesses may maintain a call center, but it can be extraordinarily difficult to determine the effectiveness of the call center or of any individual call center employee. It can also be difficult to ensure that customers or potential customers who call in to the call center receive the best experience possible.

Where call centers are provided, and especially in instances where call centers are provided by third parties (typically dedicated call center providers), it can be particularly difficult to maintain proper association between online activities (e.g., on a website), and subsequent offline activities (e.g., after a call has been placed to a call-in number).

Indeed, such difficulties cause loss of attribution between online advertising efforts and transactions that are completed offline. Additionally, it becomes difficult for businesses to know the cause of failed transactions and whether to direct remedial efforts to online or offline aspects of the sales process.

As disclosed in the related application Ser. No. 14/538,685, systems and methods have been developed that utilize an identifier other than a call-in phone number to link a customer's phone call to the customer's online activities. Such systems and methods extend the functionality of previous call tracking efforts to improve the customer management experience and to better use the assets of the advertiser in reaching its customers. The current systems and methods further extend the technologies discussed in the related application to better manage client relations to increase the effectiveness of advertising campaigns, to increase the conversion rate of customers after they reach a call center, and to increase the data available to companies about their customers and potential customers.

SUMMARY OF THE INVENTION

Implementation of the invention provides systems, methods, computer systems, and computer-readable code for implementing methods for client relation management in which fewer call-in numbers need to be maintained. The smaller pool of call-in numbers can be reused with additional web users more quickly because the system provides methods by which users who delay calling in to a call-in number until after the call-in number has been reassigned can still be associated with or linked to their earlier online activity. The system maintains associations between the call-in number and earlier online sessions and the associations can be used by call center representatives in an interactive process with callers to the call-in number to properly identify among the potential online sessions.

According to implementations of the invention, a method for client relation management, which may be performed by a computer system such as a server computer system, includes steps of serving web pages relating to sale of a product or service, the web pages each including a call-in number, each call-in number being uniquely assigned to a served web page served to a first end user for a period of time before being released for use in being served to a served web page served to a second end user, associating user website activity of the first end user with a first call-in number in a first data structure maintained by the server system, associating user website activity of the second end user with the first call-in number in a second data structure maintained by the server, receiving notification of receipt of a call to the first call-in number, delivering the first data structure and the second data structure to a call center representative handling the call to the first call-in number, such that the representative can correctly identify whether a caller to the first call-in number is the first end user or the second end user, and associating the caller with the appropriate data structure among the first data structure and the second data structure.

The first data structure and the second data structure may be just two of a plurality of data structures maintained by the system associated with the first call-in number and the method may further entail providing more than two data structures to the call center representative for identification of the appropriate data structure. The method may include a step of receiving information relating to an automatic number identification (ANI) of the call to the first call-in number and using the information relating to the ANI of the call to select among available data structures for delivery to the call center representative. The method may include a step of receiving information relating to a geographical location of the caller to the first call-in number and using the information relating to the geographical location of the caller to select among available data structures for delivery to the call center representative. The method may include a step of using the association of the caller with the appropriate data structure to link the call to the first call-in number to an online advertising campaign.

Implementation of the invention provides systems, methods, computer systems, and computer-readable code for implementing methods for client relation management in which fewer call-in numbers need to be maintained. According to implementations of the invention, a method for client relation management, which may be performed by a computer system such as a server computer system, preserves a more-complete record of online and offline interactions of a customer with systems provided by a plurality of service providers. The method includes steps of associating a session identifier (SID) with a customer upon interaction of the customer with a website provided by a first service provider and providing the SID to the first service provider over a network connection. The method also includes steps of receiving website interaction information from the first service provider over the network connection and associating the website interaction information from the first service provider with the SID in a data structure of the server system. The method further includes steps of receiving and facilitating handling of an incoming call from the customer at a call-in number at a call center maintained by a second service provider, whereby information associated with the call-in number is used to associate the incoming call with the SID from the data structure of the server system, creating a record of an offline interaction between the customer and an agent of the call center, and associating the record of the offline interaction with the SID, whereby a more-complete record of the customer's online interaction with the website provided by the first service provider and of the customer's offline interaction with the call center is accessible in the data structure of the server system.

Access to the more-complete record of the customer's online interaction with the website and of the customer's offline interaction with the call center may be provided to the first service provider. Access to a summary of the customer's offline interaction with the call center may be provided to the first service provider. Access to a summary of the more-complete record of the customer's online interaction with the website and of the customer's offline interaction with the call center may be provided to the first service provider.

The incoming call from the customer at the call-in number may be associated with the SID based on unique and temporary assignment of the call-in number to the website provided by the first service provider during display of the web site to the customer. The website interaction information received by and stored in the data structure of the server system may include information such as one or more screen shots of the website provided to the customer, a record of web pages provided to the customer, a record of web site elements provided to the customer, or a record of customer interactions with website elements of the website provided to the customer. The record of the offline interaction between the customer and the agent of the call center stored in the data structure may include information such as one or more screenshots of information displayed to the agent during the offline interaction between the customer and the agent, an audio recording of the offline interaction between the customer and the agent, or a written summary of the offline interaction between the customer and the agent.

The more-complete record of the customer's online interaction with the website and of the customer's offline interaction with the call center may be accessible using the SID. When a call is received at the call center, the method may further include making a determination as to whether the call is associated with a known SID and, when the call is not associated with a known SID, associating an SID with the call such as a new SID or a later-identified existing SID that is identified as a result of an interaction between the customer and the agent of the call center.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
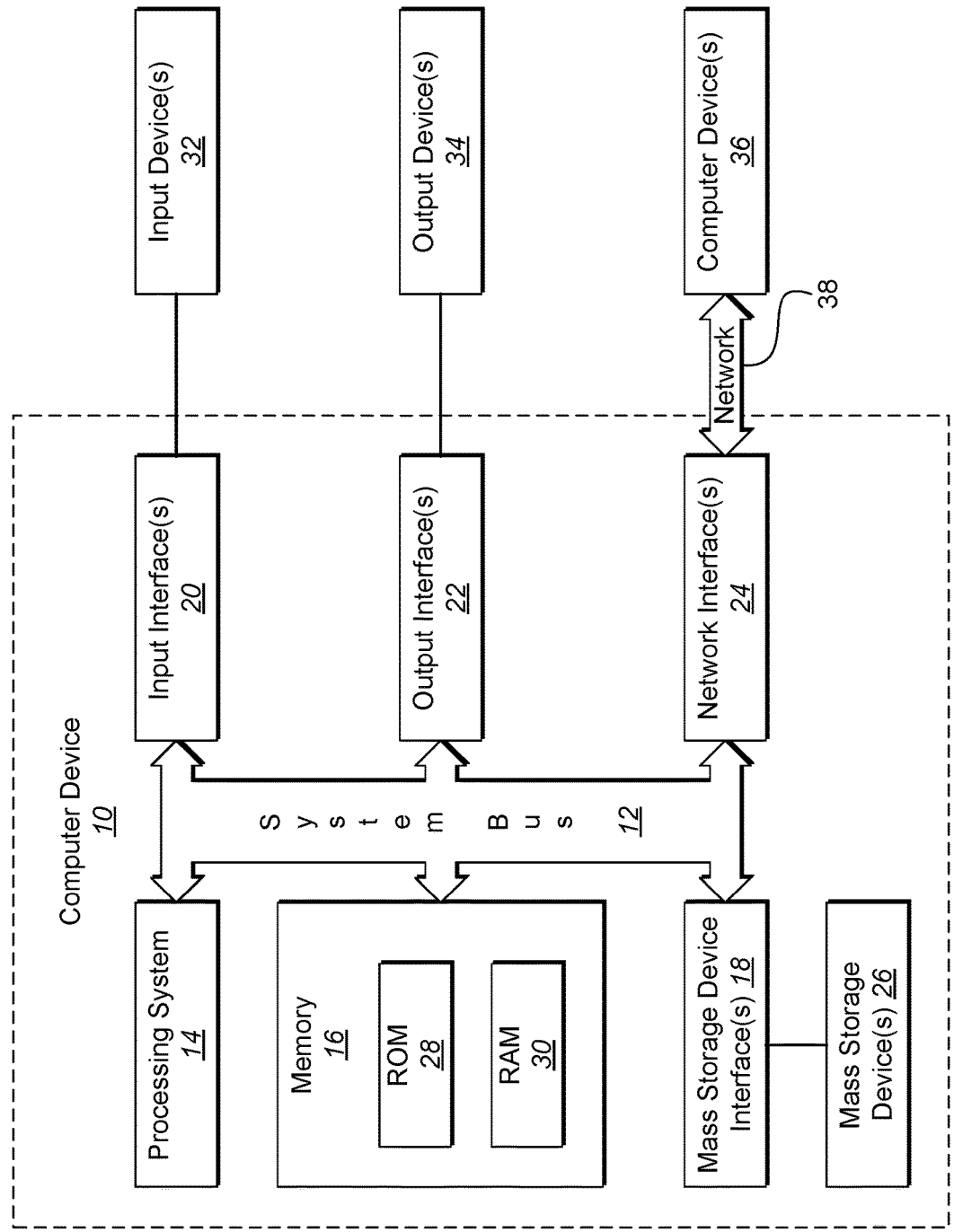
FIG. 1 illustrates a representative computing environment in which embodiments of the present invention may be implemented.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provides systems, methods, computer systems, and computer-readable code for implementing methods for client relation management in which fewer call-in numbers need to be maintained. The smaller pool of call-in numbers can be reused with additional web users more quickly because the system provides methods by which users who delay calling in to a call-in number until after the call-in number has been reassigned can still be associated with or linked to their earlier online activity. The system maintains associations between the call-in number and earlier online sessions and the associations can be used by call center representatives in an interactive process with callers to the call-in number to properly identify among the potential online sessions.

According to embodiments of the invention, a method for client relation management, which may be performed by a computer system such as a server computer system, includes steps of serving web pages relating to sale of a product or service, the web pages each including a call-in number, each call-in number being uniquely assigned to a served web page served to a first end user for a period of time before being released for use in being served to a served web page served to a second end user, associating user website activity of the first end user with a first call-in number in a first data structure maintained by the server system, associating user website activity of the second end user with the first call-in number in a second data structure maintained by the server, receiving notification of receipt of a call to the first call-in number, delivering the first data structure and the second data structure to a call center representative handling the call to the first call-in number, such that the representative can correctly identify whether a caller to the first call-in number is the first end user or the second end user, and associating the caller with the appropriate data structure among the first data structure and the second data structure.

The first data structure and the second data structure may be just two of a plurality of data structures maintained by the system associated with the first call-in number and the method may further entail providing more than two data structures to the call center representative for identification of the appropriate data structure. The method may include a step of receiving information relating to an automatic number identification (ANI) of the call to the first call-in number and using the information relating to the ANI of the call to select among available data structures for delivery to the call center representative. The method may include a step of receiving information relating to a geographical location of the caller to the first call-in number and using the information relating to the geographical location of the caller to select among available data structures for delivery to the call center representative. The method may include a step of using the association of the caller with the appropriate data structure to link the call to the first call-in number to an online advertising campaign.

Embodiments of the invention provide systems, methods, computer systems, and computer-readable code for implementing methods for client relation management in which fewer call-in numbers need to be maintained. According to embodiments of the invention, a method for client relation management, which may be performed by a computer system such as a server computer system, preserves a more-complete record of online and offline interactions of a customer with systems provided by a plurality of service providers. The method includes steps of associating a session identifier (SID) with a customer upon interaction of the customer with a website provided by a first service provider and providing the SID to the first service provider over a network connection. The method also includes steps of receiving website interaction information from the first service provider over the network connection and associating the website interaction information from the first service provider with the SID in a data structure of the server system. The method further includes steps of receiving and facilitating handling of an incoming call from the customer at a call-in number at a call center maintained by a second service provider, whereby information associated with the call-in number is used to associate the incoming call with the SID from the data structure of the server system, creating a record of an offline interaction between the customer and an agent of the call center, and associating the record of the offline interaction with the SID, whereby a more-complete record of the customer's online interaction with the website provided by the first service provider and of the customer's offline interaction with the call center is accessible in the data structure of the server system.

Access to the more-complete record of the customer's online interaction with the website and of the customer's offline interaction with the call center may be provided to the first service provider. Access to a summary of the customer's offline interaction with the call center may be provided to the first service provider. Access to a summary of the more-complete record of the customer's online interaction with the website and of the customer's offline interaction with the call center may be provided to the first service provider.

The incoming call from the customer at the call-in number may be associated with the SID based on unique and temporary assignment of the call-in number to the website provided by the first service provider during display of the web site to the customer. The website interaction information received by and stored in the data structure of the server system may include information such as one or more screen shots of the website provided to the customer, a record of web pages provided to the customer, a record of web site elements provided to the customer, or a record of customer interactions with website elements of the website provided to the customer. The record of the offline interaction between the customer and the agent of the call center stored in the data structure may include information such as one or more screenshots of information displayed to the agent during the offline interaction between the customer and the agent, an audio recording of the offline interaction between the customer and the agent, or a written summary of the offline interaction between the customer and the agent.

The more-complete record of the customer's online interaction with the website and of the customer's offline interaction with the call center may be accessible using the SID. When a call is received at the call center, the method may further include making a determination as to whether the call is associated with a known SID and, when the call is not associated with a known SID, associating an SID with the call such as a new SID or a later-identified existing SID that is identified as a result of an interaction between the customer and the agent of the call center.

FIG. 1 and the corresponding discussion are intended to provide a general description of one suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
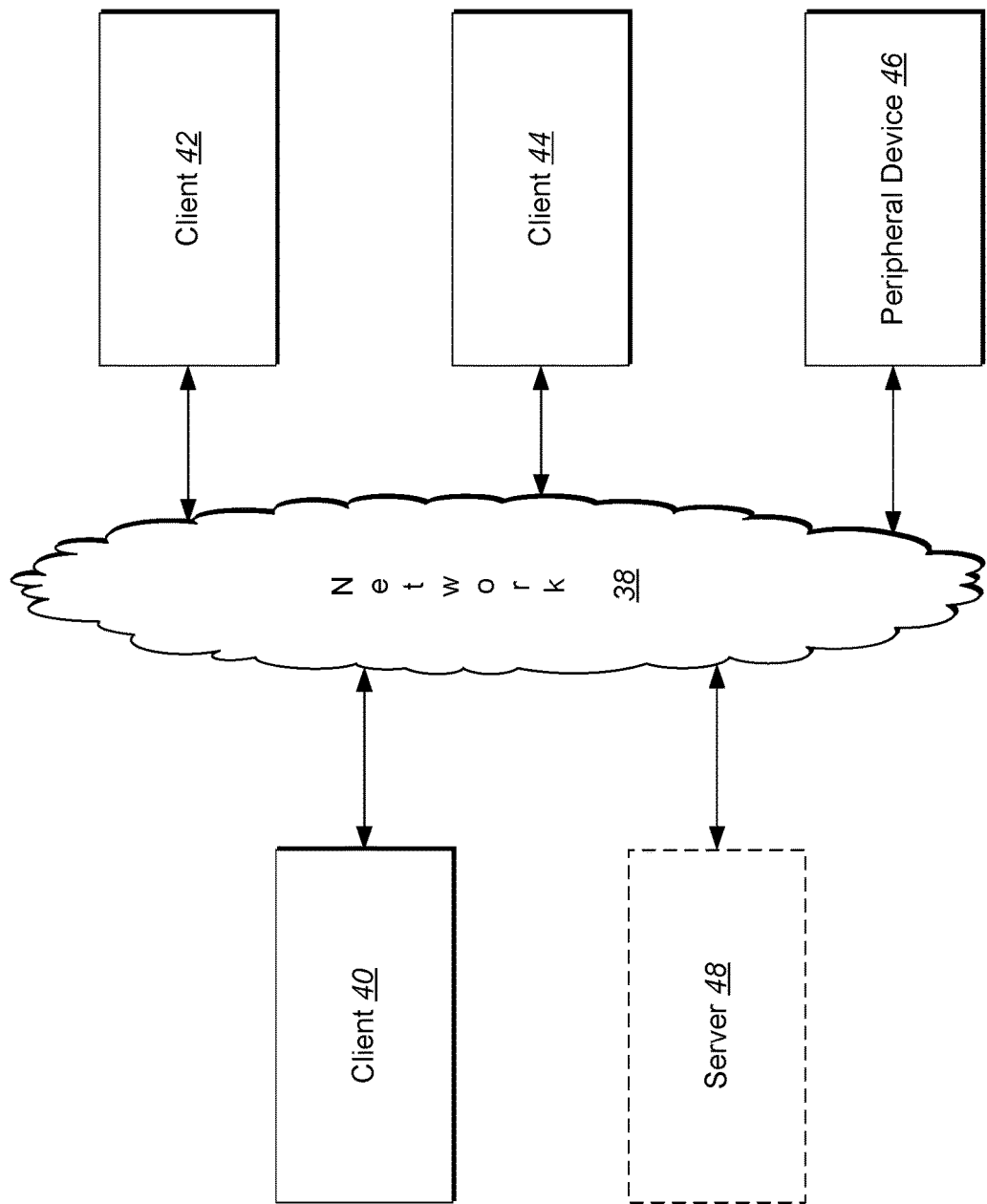
FIG. 2 illustrates a representative networked computing environment in which embodiments of the present invention may be implemented.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Figure 3:
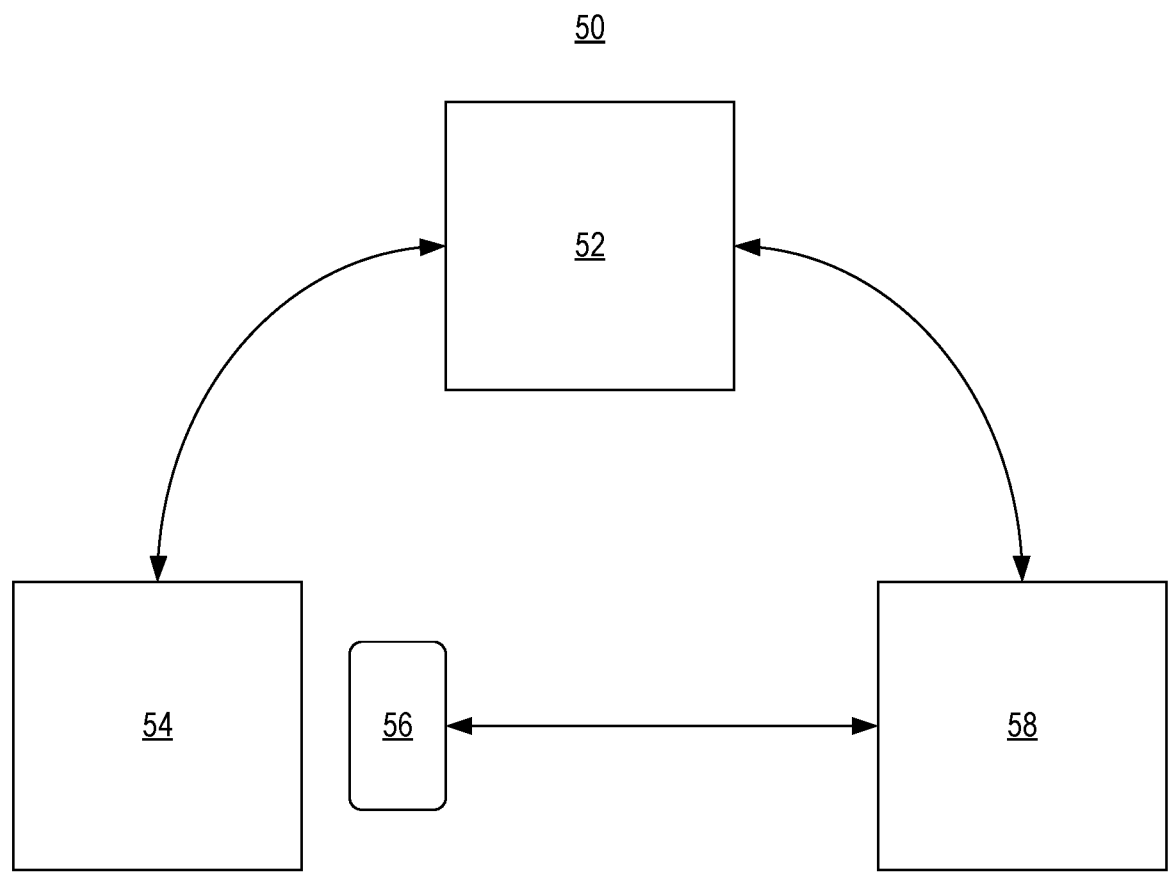
FIG. 3 illustrates an example computing environment in which the present invention can be implemented.

FIG. 3 illustrates an example computer environment 50 in which the present invention can be implemented. Computer environment 50 includes a server system 52, a client system 54, a client phone 56, and a call center system 58. For purposes of this specification, server system 52 will be described as providing a website to client system 54 and as maintaining a database that stores information about a user that visits the website.

Client system 54 can represent any of the various types of devices that a user uses to access a website, including mobile devices. Although client phone 56 is depicted as a separate system, in many implementations, client system 54 and client phone 56 may be the same device such as when a user accesses the website on a mobile phone. The depiction of separate devices is intended to emphasize that embodiments of the present invention are employed when a user visits a website seeking to make a purchase but completes the purchase over the phone.

Call center system 58 can represent a system employed by a representative at a call center to at least partially handle a phone call from client phone 56, including to assist a user to complete a purchase. Call center system 58 can also comprise a system that handles the routing of phone calls to a particular representative and that obtains information from server system 52. The term "call center" should be construed broadly to represent any configuration where a representative handles phone calls.

The depiction of server system 52 and call center system 58 as being two separate systems is for purposes of illustration and discussion only. In some cases, these two systems may be part of the same system or operated by the same entity. In other cases, server system 52 can represent the system of a company that uses a service provided by another company that implements call center system 58.

To describe the features of embodiments of the present invention, an example of a user that is seeking to book a hotel room will be used. However, embodiments of the present invention are applicable to scenarios where the user wants to purchase any item or service or to otherwise interact with a business to obtain products or services through the business. Accordingly, embodiments of the present invention extend to functionality for enhancing call tracking capabilities and client relation management regardless of the type of goods or services that are advertised or purchased.

Figure 4:
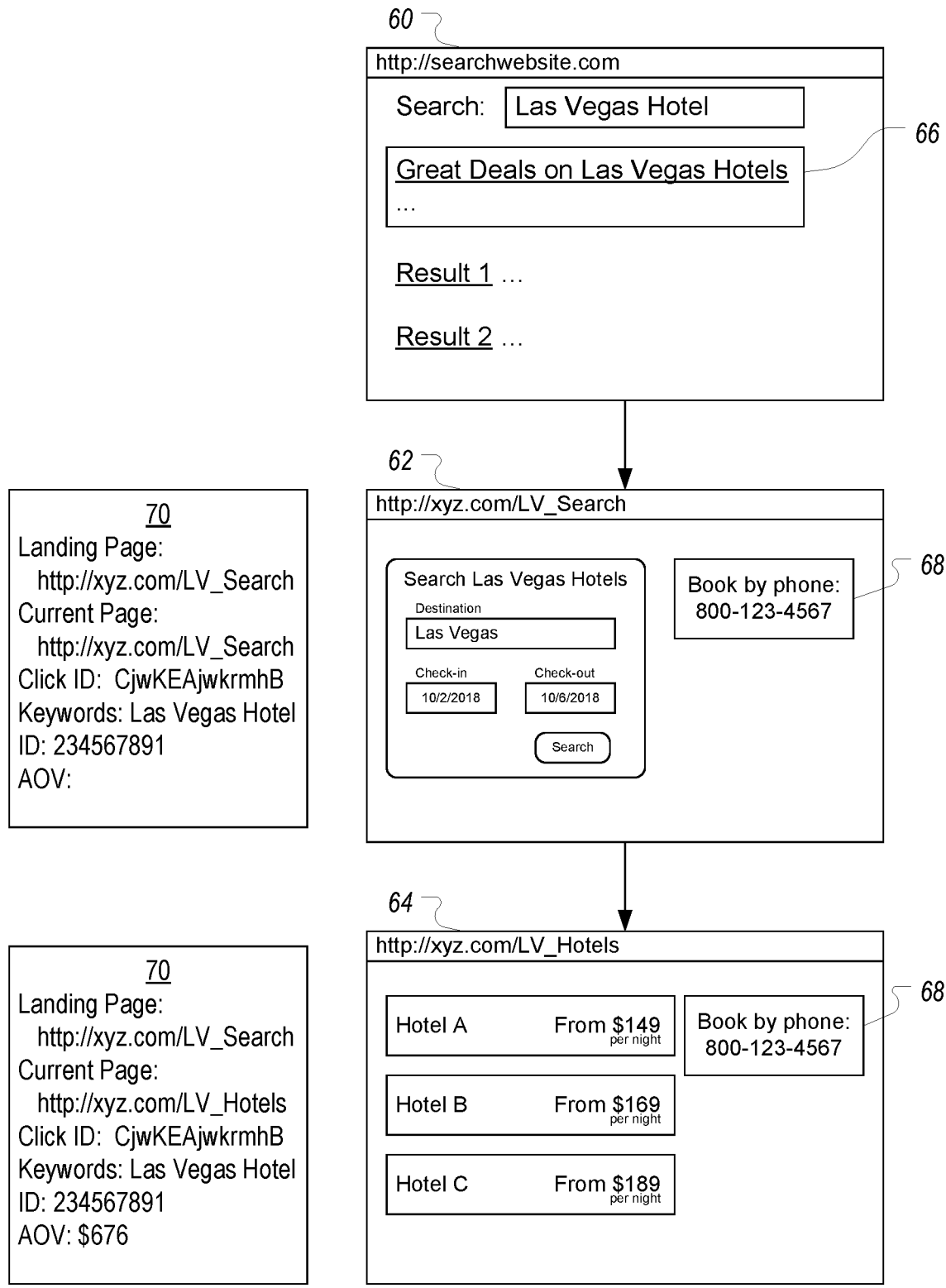
FIG. 4 illustrates a series of webpages and a data structure that is populated as a user visits the webpages.

FIG. 4 illustrates a series of example webpages 60, 62, 64 that can be displayed to a user as the user searches for a hotel room to book. Webpage 60 represents the results of a search for "Las Vegas Hotel." As is common, in addition to the results of the search query, an advertisement 66 is also displayed within webpage 60. In this example, it will be assumed that a company paid to have advertisement 66 displayed whenever a user performed a search that included the keywords "Las Vegas" and "hotel." Because the cost of such advertisements can be relatively expensive, a company may desire to track the effectiveness of such advertisements. Embodiments of the invention allow the company to perform tracking of the effectiveness of such advertisements, even when a customer calls in to a call-in center at a later point in time, after any uniquely assigned phone numbers have been reassigned to one or more other customers, thereby giving a more-complete picture to the company of the overall effectiveness of its advertisements.

Additionally, because the cost of providing call center staff and equipment can be significant, the company may desire to maximize usefulness and effectiveness of the call center and its resources (staff, equipment, etc.). Accordingly, the company may wish to consider effectiveness of the call center staff at assisting customers, including the specific effectiveness of specific call center staff vis-a-vis customers in general and specific customers or types of customers. The company may also wish to consider the activity level of customer service staff. The company may also wish to consider a variety of factors relating to individual customers and individual potential orders to maximize effectiveness not only of online campaigns, but also whether call center assistance may be effective in converting an interaction with a customer into a sale. Accordingly, embodiments of the invention allow tracking through the use of call-in numbers, but also selective handling of display of call-in numbers, and proper handling of incoming calls to the selected call-in numbers.

If the user selects advertisement 66, the user's browser will be redirected to webpage 62 which, in this example, has a URL of http://xyz.com/LV_Search. Webpage 62 includes a search box where the user can perform a search for hotels that are available between specified dates. Webpage 62 also includes a phone number 68. In some embodiments, phone number 68 can represent a tracking phone number that is uniquely associated with the user for a specified period of time (in the U.S., a direct inward dial (DID) number or a toll free number (TFN), or some equivalent in other countries, collectively herein a "phone number," "tracking phone number," or "tracking number"). Embodiments of the invention allow association of incoming calls to the tracking number with the user and with the advertising campaign even after the period of unique association of the tracking phone number has passed. In some embodiments, the phone number 68 is only selectively displayed to the customer, according to considerations discussed in more detail below. In other words, the phone number 68 may or may not be displayed on the webpage 62 upon first landing at the webpage 62, and may be displayed at a later point in time, or may be displayed upon first landing at the webpage 62, or, in some instances, may never be displayed at all.

FIG. 4 also illustrates a data structure 70 that is populated with information during the user's visit to the website xyz.com. In many implementations of the present invention, data structure 70 may be a cookie that is stored within the browser on client system 54. However, other types of data structures may also be used. In other embodiments, data structure 70 is maintained by server system 52. Data structure 70 can be used to accumulate information that may be useful for linking the user's online actions with subsequent offline actions such as when the user completes an order over the phone. As will be further described below, at least some of the information accumulated within data structure 70 can be provided to call center system 58 when the user makes a phone call thereby allowing the handling of the phone call to be customized based on this information.

As shown, while the user is on webpage 62, various fields of data structure 70 have been populated. The landing page field defines the first webpage of the website xyz.com that the user visited, or in other words, the webpage to which the user was redirected in response to selecting advertisement 66, which in this case is http://xyz.com/LV_Search.

Data structure 70 can also include a current page field. The current page field defines the current (or last) page that the user is viewing (or has viewed). As shown, while the user is viewing webpage 62, the current page field is populated with the same URL as the landing page field. Although not shown, data structure 70 may include one or more additional webpages that the user visits including all webpages that are viewed during a visit.

Data structure 70 may also include a click ID field and a keywords field. The keywords field lists the keywords that the user searched to arrive at webpage 60A. The click ID is a unique identifier provided by the advertising service that uniquely identifies the user's selection of advertisement 66 (e.g., the gclid field provided by Google). Although not shown, the click ID and the keywords are typically appended to the end of the URL of webpage 62 by the search provider.

Data structure 70 may also include an ID field. A company may employ an ID to uniquely identify a user that visits its website. Data structure 70 may also include an average order value ("AOV") field. The AOV field represents an estimate of the average value of a potential purchase that the user may make. In this example, while the user is viewing webpage 62, the AOV field is left unpopulated because it has not yet been determined what the average value of the user's potential hotel booking may be. In other examples, historical data of interactions with past customers in general, or with a repeat individual customer, as well as information relating to the original search used by the user to arrive at the advertisement 66 and/or webpage 62 may be used to generate an initial or estimate average value for the AOV field.

As shown in webpage 62, the user has entered check-in and check-out dates of 10/2/2018 and 10/6/2018 respectively into the search box. In response to the user's selection of the search button, webpage 64 will be displayed. Webpage 64 includes a listing of various hotels that have a room available during the user's specified dates. In this example, once the user has specified the desired check-in and check-out dates, it can be determined what the average order value is for this user. In particular, the average order value can be determined as the average total cost of a four night stay in the available Las Vegas hotels during the period of time in question (being searched). Using the information provided in webpage 64, the average order value for this user can be calculated as $676 (4 nights×$169 average/night). Accordingly, the AOV field in data structure 70 is shown as having been populated once the user is viewing webpage 64.

However much information is available to the server system 52 may be used when generating the average order value. For example, at an initial stage in a search for hotels, the user may only search for a city and hotel name (with no specific dates), and the average order value may be based solely on the estimated average stay length for that hotel in that city, along with the year-long average of nightly prices. If, instead, dates are specified, then the average order value may be based on the average prices for those specific dates at that specific hotel. As additional, fewer, or different details are specified (room size, amenities, number of guests, hotel chain, dates, location, etc.), the average order value may be updated from time to time or continuously. The then-current average order value may be used to determine when, how, and whether the phone number 68 is displayed to the user, and may be used in handling any phone call placed to the phone number 68 by the user.

The average order value can be calculated based on many different criteria and may be updated as the user provides more information during a visit to a website. The AOV field therefore provides a rough estimate of the potential value of completing an order with the user. Data structure 70 may contain any other additional types of information that may be useful for linking a user's online and offline actions or for otherwise enhancing the capabilities of call tracking including the ability to dynamically route a phone call to a particular representative based on the information in data structure 70. For example, data structure 70 may include an indication of whether the user is located in or out of market (e.g., whether the user is located in Las Vegas or another market). Such information can be determined in various ways as is known in the art. Data structure 70 may also include an indication of whether the user was searching for a particular property, item, or service (e.g., whether the user searched for or was looking at a particular hotel).

Figure 5:
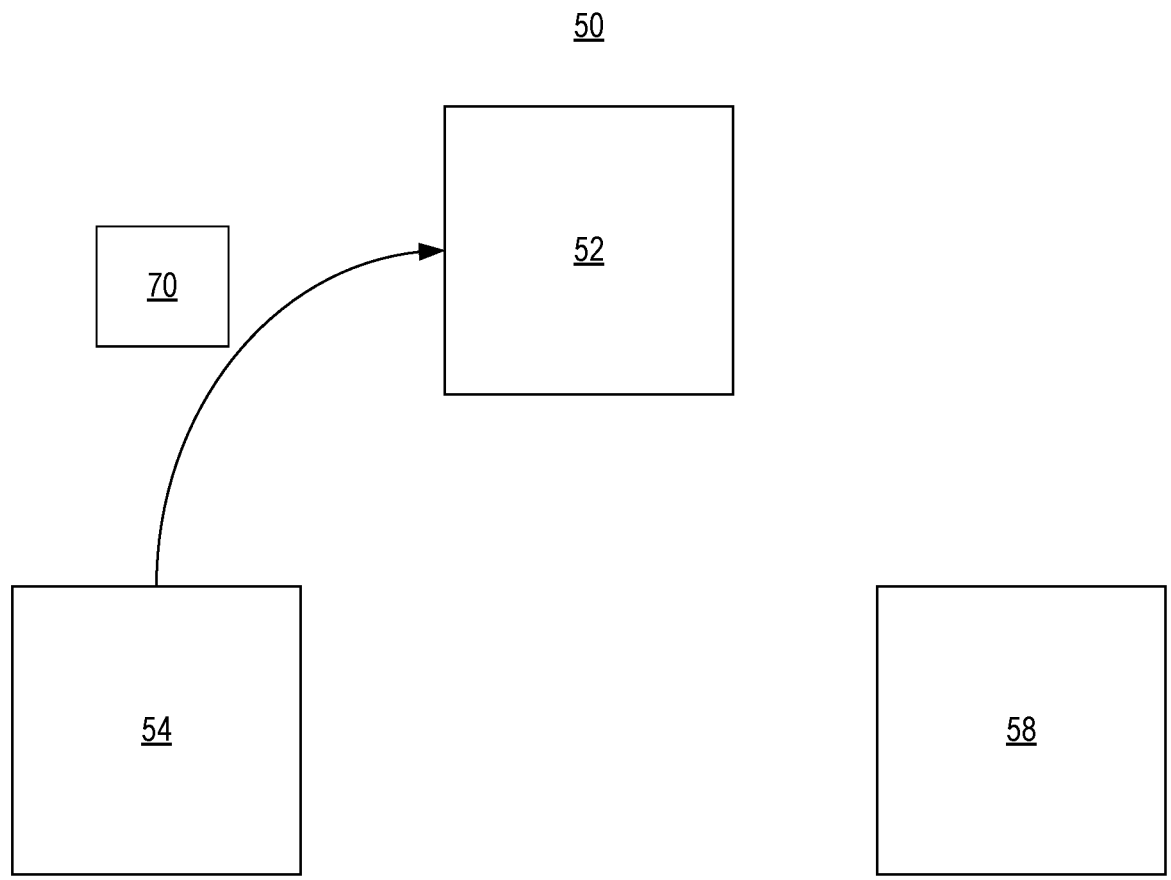
FIGS. 5-7 illustrate various communications that occur among the computer systems of FIG. 1 when a user transitions from interacting with a website to placing a phone call to a number that was listed on the website.
Figure 6:
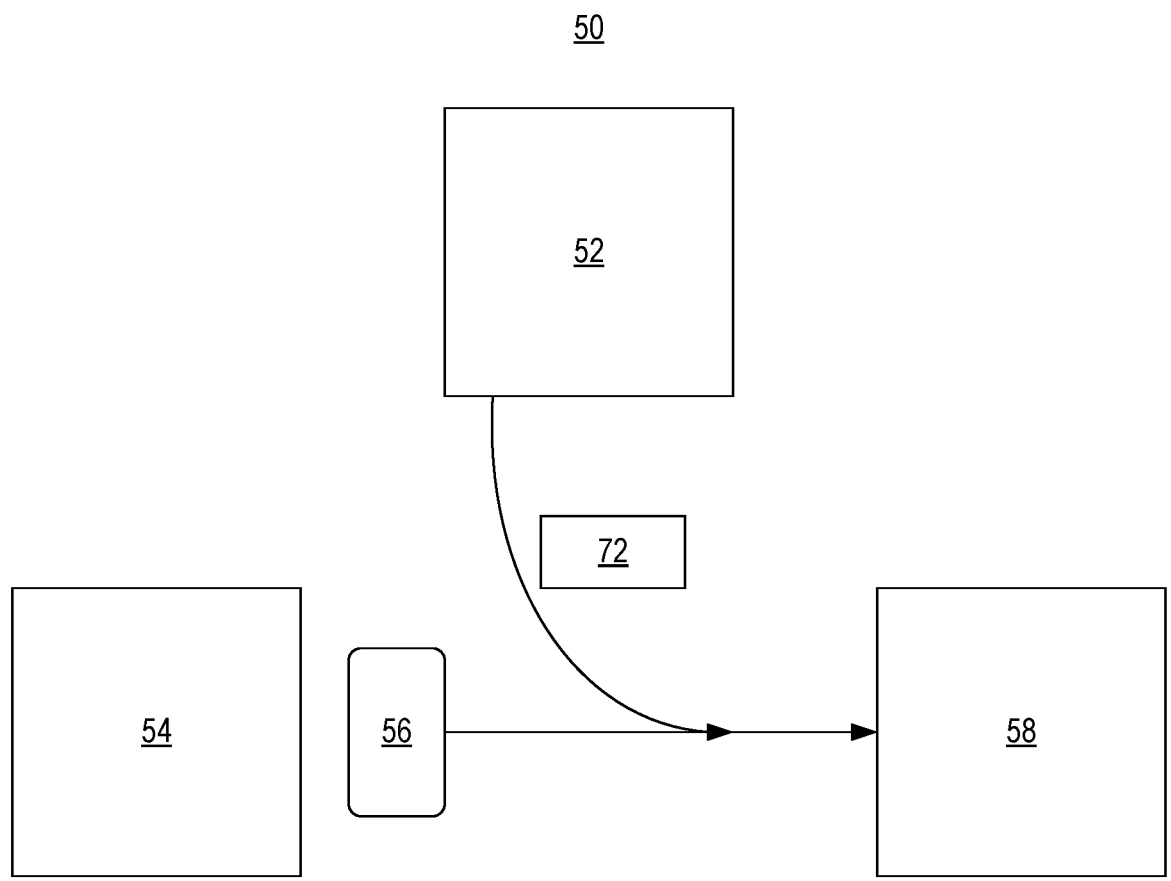
Figure 7:
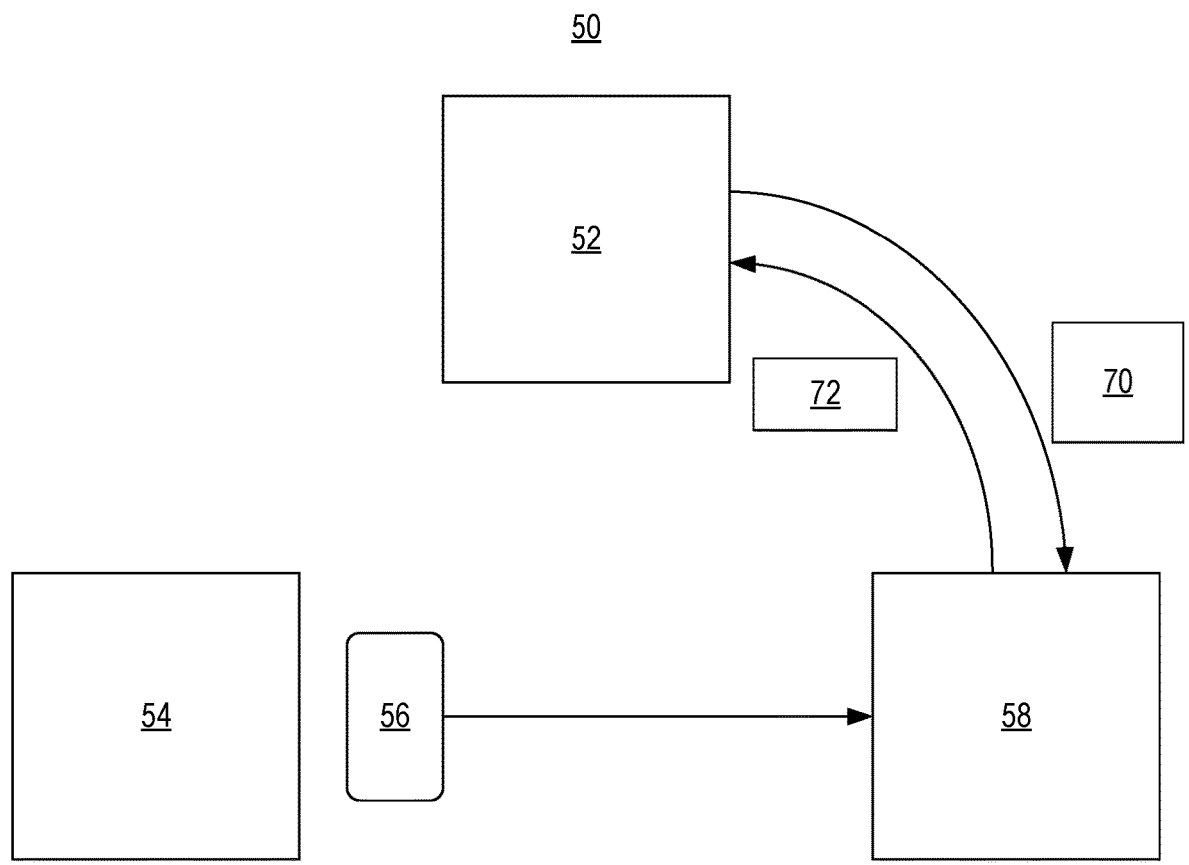
Figure 8:
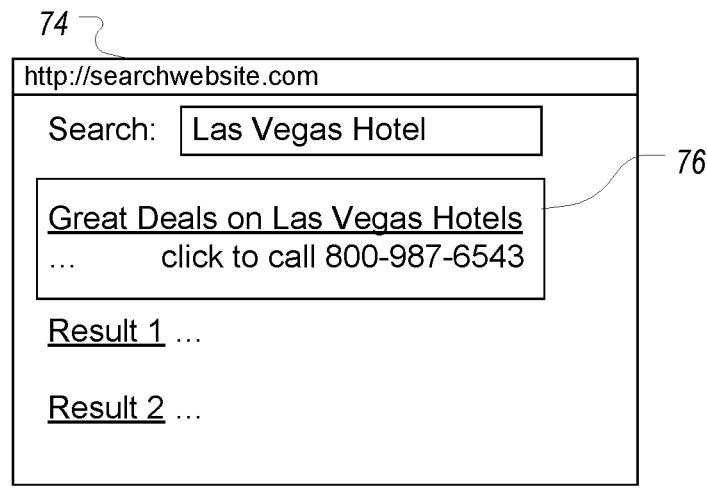
FIG. 8 illustrates an example of a webpage that includes an advertisement with a click-to-call phone number.

FIGS. 5-7 illustrate a sequence of steps that can be performed to transfer at least some of the information in data structure 70 from client system 54 to server system 52 and ultimately to call center system 58. FIG. 5 illustrates that client system 54 transmits data structure 70 (or at least some of the information contained in data structure 70) to server system 52. Client system 54 may be configured to transmit data structure 70 at various times such as whenever an HTTP request is made to server system 52 (e.g., each time the user opens a new webpage of the xyz.com website). For example, FIG. 5 can represent the communication that occurs when the user selects the search button within webpage 62 which results in webpage 64 being displayed. Server system 52 may include a database where the information from data structure 70 may be stored. In some embodiments, server system 52 can maintain information about a user so that the information can be used at a later time including to aggregate additional information obtained about the user during a subsequent visit to the website.

For example, the value of the ID field may be used to uniquely represent the user (or at least client system 54) within server system 52. In the case that client system 54 stores data structure 70 in the form of a cookie or other data structure that persists beyond a particular visit to the website, and assuming server system 52 already stores information for the user, the ID field can be used during the user's subsequent visit to the website to link any new information generated on client system 54 during the subsequent visit with the stored information for the user on server system 52.

Accordingly, FIG. 5 can represent the case where the information in data structure 70 is stored on server system 52 both when server system 52 does not previously store information for the user and when server system 52 already stores information for the user. In either case, the information is stored on server system 52 with an identifier (e.g., the value of the ID field) that uniquely identifies the user (or at least client system 54).

FIG. 6 illustrates that the user has stopped interacting online and has placed a phone call to phone number 68 using client phone 56. Server system 52 can maintain information that maps phone number 68 to the user so that when a phone call is received at phone number 68, it can be assumed that the user is making the phone call. For example, server system 52 can include a mapping between the user's ID and the phone number (e.g., ID 234567891→800-123-4567), such as by linking the phone number to the data structure 70, which is also linked to the user's ID. Because server system 52 knows that the phone number is linked with the user, in some embodiments the server system 52 (or another system with which server system 52 can communicate) can embed information into the phone call that identifies the user. FIG. 3B, for example, shows that server system 52 embeds an identifier 72 (e.g., the value of the ID field) into the phone call. In some embodiments, identifier 72 can be embedded into a Session Initiation Protocol ("SIP") header when the phone call employs the SIP. In other embodiments, the phone number itself can continue to serve as a unique identifier during a period of early call management.

As was described in the Background, traditional call tracking employs this mapping between the phone number and the user to attribute the phone call back to the user's online actions. In this traditional approach, because the phone number acts as the identifier, the phone number cannot be reused until the phone call has been handled. In contrast, some embodiments of the system here embed the identifier within the phone call so that the embedded identifier can immediately serve as the identifier once the phone call is received thereby allowing the phone number to be reused (i.e., displayed to another user) sooner. For this reason, the system allows call tracking to be implemented with fewer phone numbers.

As further described in the Background, traditional call tracking that employs this mapping between the phone number and the user to attribute the phone call back to the user's online actions is unable to properly associate incoming calls and online actions (and accordingly advertising campaigns) in situations where a delay occurs between the phone call and the online activity. This is a result of the reality that phone numbers are eventually reassigned for use with later customers such that the incoming phone call will at least initially be thought to be associated with the later assigned user and not the earlier user who delayed calling in to the displayed phone number. In contrast, the system here provides mechanisms to allow identification of the earlier online activities such that a proper association can be made, thereby extending and improving tracking of advertising campaign effectiveness while simultaneously facilitating interactions with the consumer that would otherwise represent a cold call. Accordingly, such embodiments further permit call tracking to be implemented with fewer phone numbers, even when such phone numbers are released and reassigned to other customers.

FIG. 7 illustrates that call center system 58 can extract the identifier 72 from the phone call and use it to request at least some of the information of data structure 70 from server system 52 in some embodiments. For example, when call center system 58 receives the phone call from client phone 56, it can extract (e.g., from a SIP header) the ID 234567891. Call center system 58 can then send a request to server system 52 that includes ID 234567891. In response, server system 52 can send data structure 70 (or at least some of the information in data structure 70) whether the information was obtained from the user's current (or most recent) visit to the website or from an earlier visit. Once call center system 58 has received data structure 70, it can customize the handling of the phone call. This customization can include customizing how the phone call is routed prior to the phone call being answered as well as customizing how a representative handles the phone call once answered.

In other embodiments, the phone number itself of the phone call is used to obtain information from the server system 52. In particular, the phone number itself is used by the call center system 58 and is used to request information of the data structure 70 from the server system 52. For example, when call center system 58 receives the phone call from client phone 56, it sends a request to server system 52 that includes the phone number used to reach the call center system 58. Alternatively, the request from the call center system 58 can also include the automatic number identification (ANI) or other caller ID information of the inbound call, which can further be used by the server system 52 to ensure that a correct data structure 70 is delivered to the call center system 58. Then, once call center system 58 has received data structure 70, it can customize handling of the inbound phone call.

In some embodiments, the server system 52 may provide multiple data structures 70 or information from multiple data structures 70 to the call center system 58 to facilitate the call center system's handling of the inbound phone call. The server system 52 may provide a selected number of the most recent data structures 70 associated with a particular phone number that has been displayed on websites by the server system 52, whereby if the consumer then calling the call center system 58 using the phone number is not the person then-currently viewing a website displaying the phone number but rather a consumer who previously viewed the number on another website, the call center system 58 may still be provided with information about the consumer's web session and the appropriate data structure 70.

In some embodiments, the server system 52 may provide only a single data structure 70, but with that data structure 70 being one other than the data structure 70 most-recently associated with the call-in number. If, for example, the call center system 58 provides the server system 52 with not only the phone number on which the call was received, but also so other identifying information such as the ANI information or other information geographically identifying the source of the incoming call, the server system 52 may use this information to retrieve other than the most-recent data structure 70 associated with the phone number. For example, if the server system 52 knows that the user of the client system 54 viewing the website currently displaying a particular phone number is located in New England, but that the phone call was received from a user located in California, the server system 52 may determine from other most-recent data structures 70 associated with the phone number whether any such data structures 70 were, or were likely to have been associated with a website viewer in California. If only one such data structure 70 were identified, the server system 70 might only provide that data structure 70 to the call center system 58.

Alternatively, the server system 52 may be configured to provide multiple data structures 70 to the call center system 58 in response to the request. In such embodiments, the data structures 70 provided to the call center system 58 may be ordered according to an order determined by the server system 52. The order may be a simple time-based order, in which the first data structure 70 is the data structure 70 most recently associated with the phone number, the second data structure 70 is the data structure 70 next most recently associated with the phone number, etc. In other examples, the order may be based on a likelihood of match, such that a most-likely matching data structure 70 is the first data structure (e.g., based on geographic area of the ANI number and the location of browsing to a website where the phone number was displayed), the second data structure 70 is the next most-likely data structure 70, etc. In other examples, the determination of likelihood of data structures 70 may be based on a weighting of a variety of considerations, such as timing (most recent), geography, and any other considerations. Regardless, when multiple data structures 70 are provided, the call center system 58 may provide a call center employee with information relating to the data structures 70 in an order such that the employee can confer with the incoming caller (potentially using a script) to determine a correct data structure 70 from among the provided list.

In this way, the call center employee is able to quickly associate the incoming call with a correct online experience, even when some time has passed between when the caller originally saw the phone number on the website, and even when the phone number has been reused one or more times with other customers since then. This facilitates rapid and improved handling of the incoming call, whereby the customer experience is improved and the duration of the call is significantly less than would occur in what could otherwise be deemed a cold-call situation. Furthermore, time-delayed incoming calls can be correctly associated with prior online experiences such that effectiveness of advertising campaigns can be better appreciated and evaluated.

In some embodiments, call center system 58 can be configured to route the phone call to a particular representative based on information in the data structure 70 that is eventually associated with the incoming call or based on all potentially available data structures 70 before the correct data structure 70 is identified in an interaction with the customer. For example, if the information in data structure 70 or data structures 70 includes an AOV field with a high value or an average AOV field with a high value, the phone call may be routed to a representative that is most likely to be able to complete the order with the user. Similarly, the phone call can be routed to a representative based on the current page or pages that the user is or was viewing or that the users are or were viewing such as by routing the phone call to a representative, for example, that is more familiar with Las Vegas hotels.

Once a call is routed to a particular representative, at least some of the information in at least one data structure 70 can be displayed to the representative. For example, the current webpage that the user is or was viewing of the data structure 70 (where only one is provided) or of the first data structure 70 (where multiple data structures 70 are provided) can be displayed to better inform the representative of the type of item or service that the user likely desires to purchase. Using the hotel example, displaying the current webpage can inform the representative that the user is searching for Las Vegas hotels with a check-in date of 10/2/2018 and a check-out date of 10/6/2018. Similarly, the sequence of webpages that the user visited can be displayed to the representative. For example, if the user had visited webpages for hotels in Los Angeles prior to visiting a webpage for hotels in Las Vegas, the representative may ask the user about Los Angeles hotels as well.

Where multiple data structures 70 are provided to the representative, the representative may use the available displayed information to verify that the correct data structure 70 is associated with the call. For example, if the first data structure 70 is associated with a search for Las Vegas hotels, the second data structure 70 is associated with a search for Miami hotels, the third data structure 70 is associated with a search for New York hotels, etc., the representative can use this information (typically in a script determined to be well-received by customers) to query the customer to identify the proper data structure 70. Continuing the example, the representative could ask the caller if he or she was searching for Las Vegas hotels or was interested in Las Vegas. If the caller responded negatively to the query, the representative could dismiss the information associated with the first data structure 70, and the call center system 58 could display information associated with the second data structure 70 (Miami hotels), whereupon the representative could continue the query. In some instances, the caller might volunteer the topic of the query, and the representative could scroll or otherwise sort among the available data structures 70 to determine if there is a match. Regardless, once a correct match is found, the representative may perform an action to associate the call with the proper data structure 70, which association may be passed back to the server system 52.

Each advertiser, call center, or service provider may determine a desired number of data structures 70 to provide from the server system 52 to the call center system 58. For example, in one business area it may be desirable to have five data structures 70 available for use by the representative. In another business area, it may only be necessary to provide two or three data structures 70 to the call center system 58. In other business areas, more than five data structures 70 may be provided. In some embodiments, the server system may initially provide a limited number of data structures 70, and may be configured to provide additional data structures 70 (e.g., going further back in time) in the event that no match is found and the representative requests additional data structures 70 for review. Accordingly, the system provides multiple opportunities for customization of how data structures 70 are delivered for each particular business or industry.

In some embodiments, once the phone call is routed to a particular representative, server system 52 and/or call center system 58 can store an indication that the particular representative handled the call. In this way, if the user makes another phone call at the phone number, the call can be routed back to the same representative.

Once it has been determined whether the phone call has resulted in an order, server system 52 can use identifier 72 to create an association between advertisement 66 and the result. Because call center system 58 knows the identifier that is associated with the phone call (i.e., identifier 72), call center system 58 can include the identifier when reporting any result of the phone call back to server system 52. This allows server system 52 to associate the result with the appropriate data structure that defines the online actions of the user that led to the phone call (i.e., data structure 70). For example, if the user books a hotel, identifier 72 can be used to associate information about the booking with the information in data structure 70 including, for example, associating the value of the booking with the cost of the selection of advertisement 66. Associating the result of the phone call with advertisement 66 can allow the company to better calculate the conversion rate of advertisement 66.

By including the click ID in data structure 70, server system 52 can associate the result of the phone call directly with the cost of the selection of advertisement 66. Because the click ID uniquely identifies the selection of advertisement 66, it can be used to identify how much the company paid for the selection. In the case the phone call results in an order, server system 52 can create an association between the amount paid for the selection of advertisement 66 and the value of the resulting order.

In some embodiments, a user may make a phone call before visiting the company's website. In such cases, the company will not have the opportunity to create data structure 70 before the phone call. FIG. 4, for example, illustrates a webpage 74 that includes search results similar to webpage 60. In contrast to webpage 60, webpage 74 includes an advertisement 76 that provides an option to click to call the company. Such an option may be provided when client system 54 and client phone 56 are the same (i.e., when the user is browsing on a phone-capable device).

If the user selects the click-to-call option in advertisement 76, the user's device will immediately place a phone call to the phone number which will ultimately be routed to call center system 58. To facilitate associating the phone call with advertisement 76, an identifier can be embedded within the phone call. In embodiments where the advertising service provides a click ID, the advertising service can embed the click ID that identifies the user's selection of advertisement 76 into the phone call. Then, the results of the phone call can be associated with the click ID as is described above.

As a specific example, when a user selects a click-to-call phone number within a Google Adwords advertisement, Google causes a phone call to be a made to the number listed in the advertisement. In accordance with embodiments of the present invention, Google can embed the gclid for the selection of the advertisement into this phone call. Once call center system 58 receives the phone call, it can extract the gclid and associate it with the result of the phone call as well as any information obtained about the user during the phone call. In this way, the conversion rate of the advertisement can be more accurately determined even when the selection of the advertisement does not cause the user to visit the company's website.

In some embodiments, when an identifier is embedded within the phone call in response to a user selecting a click-to-call option in an advertisement, call center system 58 can access the embedded identifier (e.g., the gclid) and use it to immediately request information from the advertising service (e.g., Google). This information can include any keywords which the user searched to arrive at the search results which included the click-to-call advertisement as well as an identification of the advertising campaign to which the click-to-call advertisement pertains. Such information can then be used by call center system 58 to dynamically route the phone call such as by routing the phone call to a particular agent or department that handles calls related to the particular advertising campaign or keyword(s). Such information may also be used during the phone call to customize how the phone call is handled.

In a particular example similar to the one described above, Google may provide an interface through which call center system 58 can submit a gclid to receive information about the click-to-call advertisement associated with the gclid. When call center system 58 receives a phone call that includes a gclid, it can immediately (i.e., prior to routing the phone call) submit the gclid to Google through the interface to receive the relevant information. In this way, the information can be immediately received to allow the phone call to be routed and/or handled based at least partially on the information.

In summary, embodiments of the system allow linking of a phone call to a particular phone number to a particular user, even when time has passed between when the phone number was originally displayed to such user and when the phone number has subsequently been reused with respect to other users. Additionally, an identifier, other than a phone number, may then be used to link a phone call to a particular user. In these ways, a phone number can be reused sooner than with traditional approaches thereby minimizing the number of tracking phone numbers that are required to implement call tracking. Reducing the number of tracking phone numbers that used can reduce the cost and complexity of a call center system.

In some embodiments, data structure 70 can be employed to determine when to display a tracking phone number to the user. For example, because it typically costs more to have a user call a call center to complete an order rather than to complete an order online, the decision of if or when to display a tracking phone number can be based on the average order value within data structure 70. If the AOV field of data structure 70 indicates that the potential order is of high value, a tracking number may be prominently displayed to encourage the user to call the call center so that a highly qualified representative can assist the user. In contrast, if the AOV field of data structure 70 indicates that the potential order is of low value, a tracking phone number may not be displayed at all, may only be displayed once the user has reached a particular webpage, or may only be displayed once the user has performed certain interactions with the website indicative of a certain likelihood to complete the transaction via the call center.

Using an average order value or some other interaction with the website to determine whether to display a call-in phone number is just one example of a manner in which information regarding the user and the user's interaction with the website may be used to handle or modify the system's interaction with the user. In embodiments of the system, the system may score the user or the likelihood that the user will place a hotel reservation. This estimation of the likelihood of placing a booking may then be used intelligently to manage the website(s) displayed to the user, the user future interaction with the system, and the user's experience on calling in to the call center, if applicable.

By way of example, the user's past interactions with the system can be used to inform the system of the likelihood that the user intends to book a reservation as part of the current interaction with the system. For example, when the user is a repeat customer, a history of the user's interactions may be used as a consideration in the system's determination of the user's likelihood of completing a hotel booking (in the case of lodging reservation systems) or other purchase transaction (in other industries). If, for example, the user has visited the website in the past and has completed a booking each time, then it may be determined that the likelihood of a booking with the current visit is quite high. As another example at the other end of the spectrum, if the user has visited the website multiple times in the past and has never completed a booking, then it may be determined that the likelihood of a booking with the current visit is low. As an intermediate example, the user might have visited the site multiple times in the past and the past interactions could be indicative of a process (such as a process of conducting research) leading to a near-term purchase/booking decision. In such an instance, even though past interactions might not have resulted in a purchase, the system might determine that the likelihood of a booking occurring is relatively high.

Other user interactions with the website may alter the score indicating the likelihood that the user intends to book a reservation or otherwise complete a purchase. For example, the farther the user proceeds from the initial landing page toward a final booking page, the greater the user's score may increase. Additionally, even if the user does not specifically proceed to booking, the longer the user spends on the website and the individual pages the user visits/views may be used to alter the score assigned to the user. Any other data points surrounding the user and the user's past and current interactions with the website/system may be used to inform the score assigned to the user.

The user's interactions with the system that are used in assigning or modifying the user score are not necessarily limited to online interactions, but may include past and current interactions with the call center. If the user has used a call-in phone number in the past to interact with the call center, information relating to that offline transaction may be included in the data structure 70 maintained by the server system 52. When the user uses the client system 54 to visit the website again in the future, the information relating to the past offline transaction (or transactions) may be used to update the data structure 70 (e.g. cookie) on the client system 54 or at a minimum the past interactions may be used in conjunction with the current interaction to determine a likelihood of completing a booking transaction and assigning a score to the user.

The user score need not be based solely on information relating to the particular user, but may also be based on demographic information relevant to the user and available to the server system 52. For example, the server system 52 may be able to determine that an IP address of the client system 54 is associated with a particularly affluent geographical region or Internet Service Provider (ISP) and may associate an increased average order value with users from that geographical region or ISP. Additionally, past experience with other customers from that geographical region or ISP may indicate that users from that region/ISP are more or less likely to complete a booking transaction, and such information may be used to update the score assigned to the user accordingly.

As another example, the user score may be further based on indicia related to the user's search. For example, if the user's search was more general and did not include dates, the score assigned to the user may be less than if the user's initial or additional searches were more specific about dates, specific hotels, specific amenities, etc. As another example, the score assigned to the user might vary depending on whether the search included a search for air and/or ground transportation. As still another example, the score assigned to the user might vary depending on the target location of the search, based on past experience with conversion of the target location. As a specific example, experience may show that consumers searching for lodging at one location (e.g., a geographic location tending to attract work travelers) tend to convert and place a booking at a higher rate than consumers searching for lodging at another location (e.g., a geographic location tending to be a dream vacation location that consumers look at and dream about but don't book).

Accordingly, a wide variety of factors, including factors not specifically explained herein, may be used to assign a score to the user, the score being representative of a likelihood of the user completing a booking or other purchase transaction. The user score may be updated from time to time or continuously, and may be used by the system in a variety of ways to customize the user's online and offline experience. With respect to the user's online experience, the user's score may be used to modify the information that is displayed on the website and that is returned to the user as a result of the user searches. As one example, as discussed above, a call-in phone number may only be displayed to the user when the user score exceeds some minimum value. Alternatively, the call-in phone number may be displayed only at demand of the user or may be minimized in size when the user score is too low.

As another example, the booking options displayed to individual users may be modified depending on the users' individual scores. In one example, the system may only show hotels with an average nightly rate exceeding a certain dollar value, based on the user score of that user and the likelihood that the user will place a booking. As another example of modifying booking options, the system may only show hotels from certain chains, may only show rooms of a certain quality or amenity level, or may modify any options displayed to the user. In some instances, even the phone number displayed to the user may be modified upon a page transition or reload to adjust the manner in which the incoming call is directed (such as to direct any eventual incoming call to agents better able to close an offline transaction). Accordingly, the revenue generated from the user may be maximized.

With respect to offline interactions (interactions after the user calls the call-in phone number), as the user's score increases, the manner in which a call coming in to any displayed call-in number is handled may be modified. As one example, the call may be routed to particular call center teams or agents who are expected to be best able to service a caller expected to complete a booking or other purchase transaction. When the incoming call is handled by each agent, the user's score or some representation of the user's score may be displayed to the agent, such that the agent is aware of the system-determined likelihood that the caller will complete the transaction as a result of the call. In some instances, special offers may be provided to the user based on the user score and an anticipated likelihood that a special offer may cause the caller to complete a booking or other purchase transaction.

Additional examples of modifications to the offline interactions that may be provided based on the user score at the time of the incoming call include selection or modification of scripts that are displayed to the agent handling the incoming call. Such modified scripts may include the greeting given to the incoming caller, the options returned for agent-handled searches within the call center, or any other script used by the agent in handling the incoming call from the start to the end of the call process. Accordingly, the score assigned to the user at any point in the process may significantly impact the manner in which the user's online experience and offline experience is handled by the system, by call center agents, etc.

In some instances, the action of calling in to the displayed phone number may be an action that causes an adjustment to the user score. Depending on the interaction up to the point of calling in to the displayed phone number, the adjustment to the user score may be a decrease of the score (and accordingly a decrease to the determined likelihood of completing a booking) or it may be an increase of the user score (and accordingly an increase to the determined likelihood of completing a booking).

The determination of the score may be made based on a wide variety of user-specific factors as well as a wide variety of system-wide factors. User-specific factors that may be incorporated into the user score may include past history factors, such as the number of times the user has completed similar bookings in the past (e.g., if the user often searches for and then completes bookings to a certain location, such as for work, a search for such location might increase the assigned user score), the point in the process the user has achieved (e.g., an initial search only, viewed certain hotels, selected certain rooms, reached a booking page, etc.), the amount of time the user has spent on the website provided by the system, known or determined demographics of the user, and the like. System-wide factors that may be incorporated into the user score may include factors relating to similarly situated users (e.g., geographically similar, demographically similar, etc.), as well as factors relating to all system users. Such factors may include a history of other users who are similarly situated in one or more ways who complete bookings or other purchase transactions after having reached a similar point in the process, a history of users who have completed similar searches and proceeded to complete bookings or other purchase transactions, and the like. Accordingly, the system may use all information available to it to assign and manage each user's user score.

In embodiments of the system, the identifier other than a phone number is associated with information relating to the user (consumer, customer, or potential customer) as discussed with respect to FIG. 7. In particular, the data structure 70 may be used in some embodiments to accumulate and store data relating to the user and/or the user's interaction with the webpage 60, the webpage 62, the webpage 64, and any related webpages, searches, intermediate pages, etc. visited by the user prior to initiating the call to the call center. Any or all of this information may be transmitted to the call center system 58 and associated with the identifier for immediate use in handling the user's call to the call center. In addition, however, the data associated with the data structure 70 may be accumulated and stored, either by the call center system 58 or the server system 52 as a user interaction record.

Furthermore, the data structure 70 may be updated as a result of the user's interaction with the call center, and the updated information may be stored for use when dealing with the user in the future. By way of example, and as discussed previously, the data structure 70 or other data store storing information relating to the user may be updated with information identifying the customer service representative with whom the user dealt, so that the user can be reconnected with the same customer service representative on a future call, at least whenever possible. As another example, the data structure 70 may be updated with information relating to any actions completed through the call center, such as completion of a reservation. As another example, the data structure 70 may be updated with information relating to any actions taken by the call center that did not result in completion of a reservation. For example, the customer service representative might update the data structure 70 with information relating to topics discussed, future travel plans of the user, questions posed by the user, interests expressed by the user, and the like. The customer service representative could also update the data structure 70 with information relating to any additional information observed by the customer service representative, such as perceived impediments that may have prevented the user from completing a reservation during the call.

Figure 9:
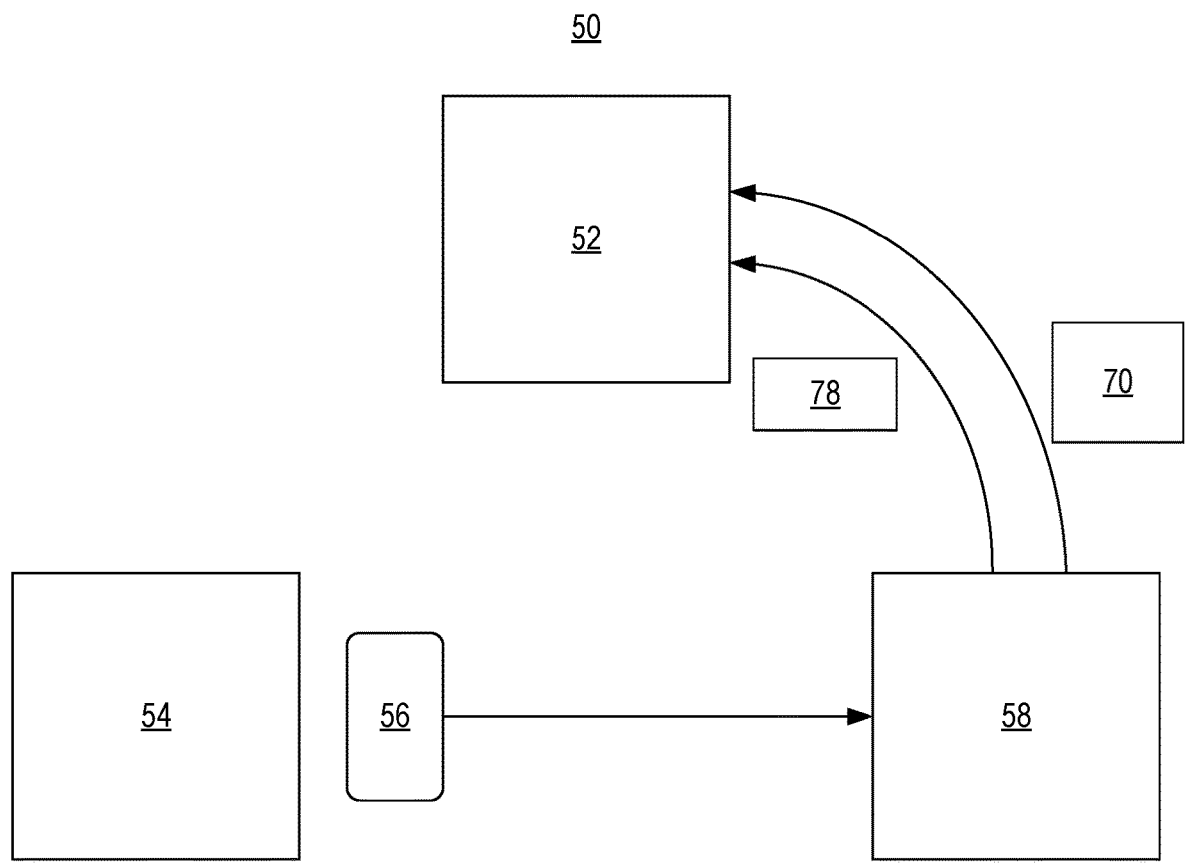
FIG. 9 illustrates further communications that may occur among the computer systems of FIG. 1 to accumulate information relating to an experience profile relating to a user experience with respect to the system.

The information gathered by the call center representative may be entered into the call center system 58, either updating the data structure 70 directly, or updating a separate information structure 78. Then, as illustrated in FIG. 9, either the updated data structure 70 is retransmitted back to the server system 52 for further processing and storage, or the separate information structure 78 is transmitted back to the server system 52 for use in updating the data structure 70. In some embodiments, multiple different data structures may exist, be used/transmitted, and stored. Accordingly, the data structure used and stored by the server system 52 or the call center system 58 may differ from and may contain additional information than the data structure 70 transmitted to the call center system 58 or transmitted from the call center system 58. Accordingly, references herein to the data structure 70 should not be taken to require use of a single unified data structure.

In some instances, the data structure 70 may be updated with information from a variety of sources, including sources associated with a variety of parties or entities, such as when the website, the advertising services, the call center system 58, and/or the server system 52 are provided by more than one entity. In such instances, embodiments of the invention provide for handling and management of information regarding the user/customer in a unified and complete way to ensure that complete tracking of the user's interactions with the various entities occurs and that a more-complete picture of the customer experience is maintained. Accordingly, using embodiments of the invention, the results of online advertising efforts are not tracked only through completion of the online phase, but continually through completion of the offline phase of customer interaction as well. In addition to permitting proper attribution of the results of online advertising campaigns when the transactions is completed offline, such systems permit ongoing attribution across multiple service providers, as well as maintaining a complete record of interactions to permit improvement of any step of the customer interaction process.

When multiple parties provide services related to the online and/or offline interactions with the customer, the associated session identifier (SID) may be used across parties to facilitate tracking and handling of the various interactions with the customer. Accordingly, one party (e.g. server system 52, or alternatively the provider of the website originally) may associate a SID with a customer upon interaction of the customer with a website. In instances where the customer is a repeat customer, the SID that is associated may be an existing SID previously associated with the customer. Where the customer is a new customer, or where it is not known whether the customer is a new customer or a returning customer, a new SID may be associated with the customer and/or his or her session on the website. If it is later determined that the customer is, in fact, a repeat customer, the new SID may be merged with an SID previously associated with the customer, may be replaced with the SID previously associated with the customer, may be associated with the SID previously associated with the customer, or may be otherwise handled to be linked with, replaced, merged with, associated with, etc., the prior SID such that the server system 52 can recognize the current interactions in conjunction with past interactions of the customer.

In this example, the website is being provided by a first service provider. As indicated, the SID may be provided by the server system 52 (e.g., as a second service provider), or may be provided by the first service provider. As the customer interacts with the website, the website provider (first service provider) may take various actions to record the customer's interactions with the website, or may facilitate another entity's recordation of the customer's interactions with the website. By way of example, the record of the customer's interactions with the website may include one or more screen shots of the website as it was presented to the customer, to facilitate later evaluations of the effectiveness of the website as presented to the customer. Accordingly, a third party may be engaged to capture the one or more screen shots of the website. These screen shots may be stored by the server system 52 in associate with the SID.

Accordingly, the server system 52 may receive website interaction information regarding the customer's website interaction from a variety of sources. The server system 52 may also generate some website interaction information, such as by being associated with the party creating the one or more screen shots of the website as presented to the customer. The server system 52 may receive the one or more screen shots or other website interaction information from the provider of the website or from a third party contracted to obtain the screen shots or other website interaction information. The server system 52 may receive any type of website interaction information from any party, but receives it in a way that allows the server system 52 to associate the website interaction information with the correct SID. Such website interaction information may be received over a network connection and may be stored within a data structure (e.g. a database) maintained by the server system 52.

As discussed previously, a call center may receive a call from the customer at a telephone number temporarily and uniquely associated with the website. In this manner, the call center may associate the telephone call with the SID, or the call center may transmit information associated with the incoming call to the server system 52 such that the server system 52 can identify the SID and transfer associated information to the call center for use by an agent of the call center. The call center may be maintained by another party, which may or may not be associated with the party maintaining the server system 52 and/or the website. Because, however, the SID is maintained between the various entities' systems, the offline interaction at the call center can be associated with the online activity previously recorded and associated with the SID, regardless of the number of entities that have been involved in interacting with the customer online or offline. Accordingly, a record of the offline interaction with the customer can be made and associated with the SID, whereby a more-complete record of the customer's online interaction with the website provided by the first service provider and of the customer's offline interaction with the call center is accessible in the data structure of the server system.

Any party determined to benefit from access to the record of the customer's interactions can be provided in a variety of manners. By way of example, access may be provided to the more-complete record of the customer's online interaction with the website and of the customer's offline interaction with the call center. Alternatively, access may be provided to a summary of the customer's offline interaction with the call center only, assuming the website provider already has access to the online interactions. Alternatively, access to a summary of the more-complete record of the customer's online interaction with the website and of the customer's offline interaction with the call center may be provided such that the website provider need not maintain its own copy of online interactions once they have been transmitted to the server system 52.

In some instances, as discussed herein, the call center may not know that the incoming call is associated with a particular existing SID. For example, if the call-in number has been disassociated with the website activity due to the passage of time or for some other reason. In such instances, as discussed herein, a temporary SID (or its equivalent) may be assigned to the offline session with the incoming call while methods as discussed herein may be used to attempt to associate the incoming call with a correct preexisting SID. By way of example only, such efforts may include working through prior sessions to which the call-in number has been assigned, using caller ID or automatic number identification (ANI) to identify the incoming caller, and the like.

As the offline interactions with the customer occur, a variety of information relating to such offline interactions may be recorded and associated with the SID. Records of such interaction may then be transmitted back to the server system 52 for association with the SID and storage. The offline interaction records may include a variety of records, and may include information displayed to a call center agent handling the call, recordings of the incoming call, records of completed transactions, screen shots of the information displayed to the agent handling the call, and summaries of any of the information accumulated during handling of the incoming call.

Regardless of the manner in which information is collected and stored by the system, the server system 52 accumulates data regarding the user's interaction with the various webpages including the advertising campaigns that were viewed and/or selected by the user, information regarding the user's interaction with the call center, and the associated conversion rate. The accumulated and stored data may also include information regarding any consummated reservations that were placed. Accordingly, the stored data represents an experience profile relating to the user's experience with respect to the reservation system or other service provider providing services through websites and call centers.

The experience profile may be used by the system in a variety of ways. Initially, the experience profile may be utilized by the system in a process to evaluate and improve a marketing campaign and/or bidding process used by the system to evaluate and improve the advertising campaign. Specifically, when the user completes a reservation/purchase through the system, the information contained in the data structure 70 may be updated to reflect that the advertising campaign resulted in a conversion, along with the actual order value of the converted advertising impression. When the user terminates interaction with the system (e.g., with the call center representative) without completing a reservation/purchase, the information contained in the data structure 70 may be similarly updated to reflect that the advertising campaign did not result in a conversion. Accordingly, when the system receives this information, advertising expenditures may be adjusted to favor more-successful advertising campaigns and efforts resulting in more conversions and to disfavor less-successful advertising campaigns and efforts.

Figure 10:
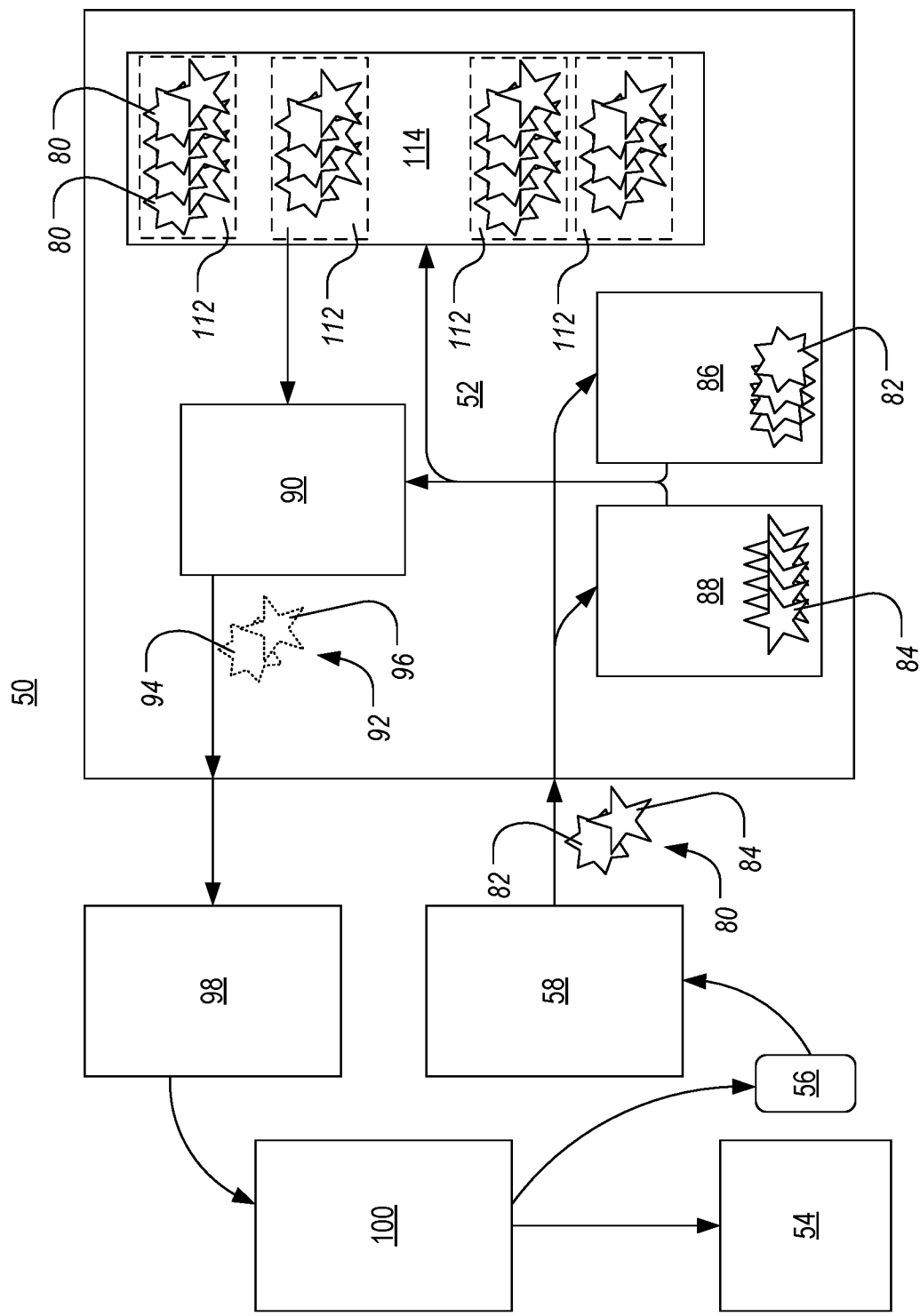
FIGS. 10-12 illustrate manners in which information relating to user experience with respect to the system may be utilized by the system.

FIG. 10 illustrates how an experience profile 80 may be generated and/or handled by the system. The experience profile 80 may be generated in whole or in part by the call center system 58 or may be generated in whole or in part by the server system 52. In some embodiments, the data structure 70 serves as the experience profile 80, while in other embodiments, the data structure 70 serves only as a source of information for the experience profile 80. In the example of FIG. 10, the experience profile 80 was generated in part by the call center system 58 and is transmitted back to the server system 52 for further use. In this illustration, the experience profile 80 includes information relating to the user's online activities, potentially including, without limitation, information relating to web searches performed, resulting advertisements displayed and/or clicked, websites viewed as a result of clicking on advertisements and within the websites thereafter, searches performed on the websites, call numbers displayed, click-to-call actions received, and the like. The experience profile 80 also includes information relating to the user's offline activities, including information relating to the user's activity in relation to the call center, such as the representative who assisted the user, notes or other information relating to the discussion with the user, recommendations for reservations and/or purchases that were made, reservations and/or purchases that were actually made, and the like. Some of this information contained in the experience profile 80 may have originated with the server system 52 and have been passed to the call center system 58 as discussed with respect to FIGS. 5-7.

Accordingly, the experience profile 80 may include an online component 82 and an offline component 84. In some instances, a particular experience profile 80 may include only an online component 82, such as where a reservation or purchase is made wholly without resort to the call center. In such instances, the experience profile 80 may not pass through the call center system 58, but may be generated and maintained wholly by the server system 52. In other instances, a particular experience profile 80 may include only an offline component, such as where a call center receives and handles an incoming call that is not related to a contact first initiated on a webpage or at least not directly attributable to a contact first initiated on a webpage. By way of example, in one experimental lodging reservation system, it has been observed that approximately 55% of reservations involve at least some phone contact. Accordingly, in that system, approximately 45% of experience profiles 80 have no offline component 84. Of the 55% of reservations involving at least some phone contact, approximately 90% of experience profiles 80 have data relating to a related Internet session. Accordingly, in that experimental system, approximately 5.5% of all experience profiles 80 in that system have only an offline component 84. The remaining approximately 49.5% of all experience profiles 80 have both an online component 82 and an offline component 84.

Regardless of whether the experience profile 80 includes only an online component 82, only an offline component 84, or includes both an online component 82 and an offline component 84, the server system 52 uses the information in the experience profile in various manners. The server system 52 may maintain one or more databases of experience profile information. For example, in the embodiment of FIG. 10, the server system 52 includes an online database 86 that stores the online components 82 and an offline database 88 that stores the offline components 84. The online database 86 and the offline database 88 may include appropriate links to the corresponding information in the other databases 86, 88, as desired to maintain a whole experience profile 80.

The server system 52 may include a processing engine 90 that is adapted to obtain information from the experience profiles 80 stored in the online database 86 and the offline database 88, and to use the information or portions thereof in adjusting the advertising campaigns and/or marketing efforts of the reservation provider or other business using the call center. The processing engine 90 may be any type of processing system that is adapted to use the information from the user experience profiles 80. In some embodiments, the processing engine 90 is or includes a neural network adapted to utilize the information and adjust the marketing efforts and/or advertising campaigns. In other embodiments, the processing engine 90 is or includes an artificial intelligence (AI) adapted to utilize the information and adjust the marketing efforts and/or advertising campaigns. The processing engine 90, the online database 86, and the offline database 88 may make up a client relation manager that manages client relations to improve the user experience, click-through, and conversion.

Regardless of the specific makeup of the processing engine 90, the processing engine 90 may generate an instruction set 92 of instructions relating to the reservation system's advertising efforts (or, for other non-lodging reservation system entities, for such entities' advertisings), and may transmit such instructions to an advertising partner 98 (e.g., Google AdWords, etc.). The instruction set 92 may include an online subset 94 of instructions derived from information from the online component 82 of the experience profile 80. The instruction set 92 may also include an offline subset 96 of instructions derived from information from the offline component 84 of the experience profile 80. The instruction set 92 may, for example, adjust the bidding algorithms used based on the keywords used by the user in his or her search that resulted or did not result in reaching the lodging reservation provider's website and/or converting a reservation or sale. Thereafter, as the user and/or other users conducts searches and/or reaches the website 100, the lodging reservation provider will hope to benefit from improved click-through and conversion rates.

In some embodiments, the processing engine 90, such as the neural network and/or AI, may improve in its abilities to detect the effectiveness of advertising efforts and in its abilities to process the information contained in the experience profiles 80 to maximize effectiveness of the advertising efforts and of adjustments to the advertising efforts both for individual users as well as for the Internet community as a whole.

Figure 11:
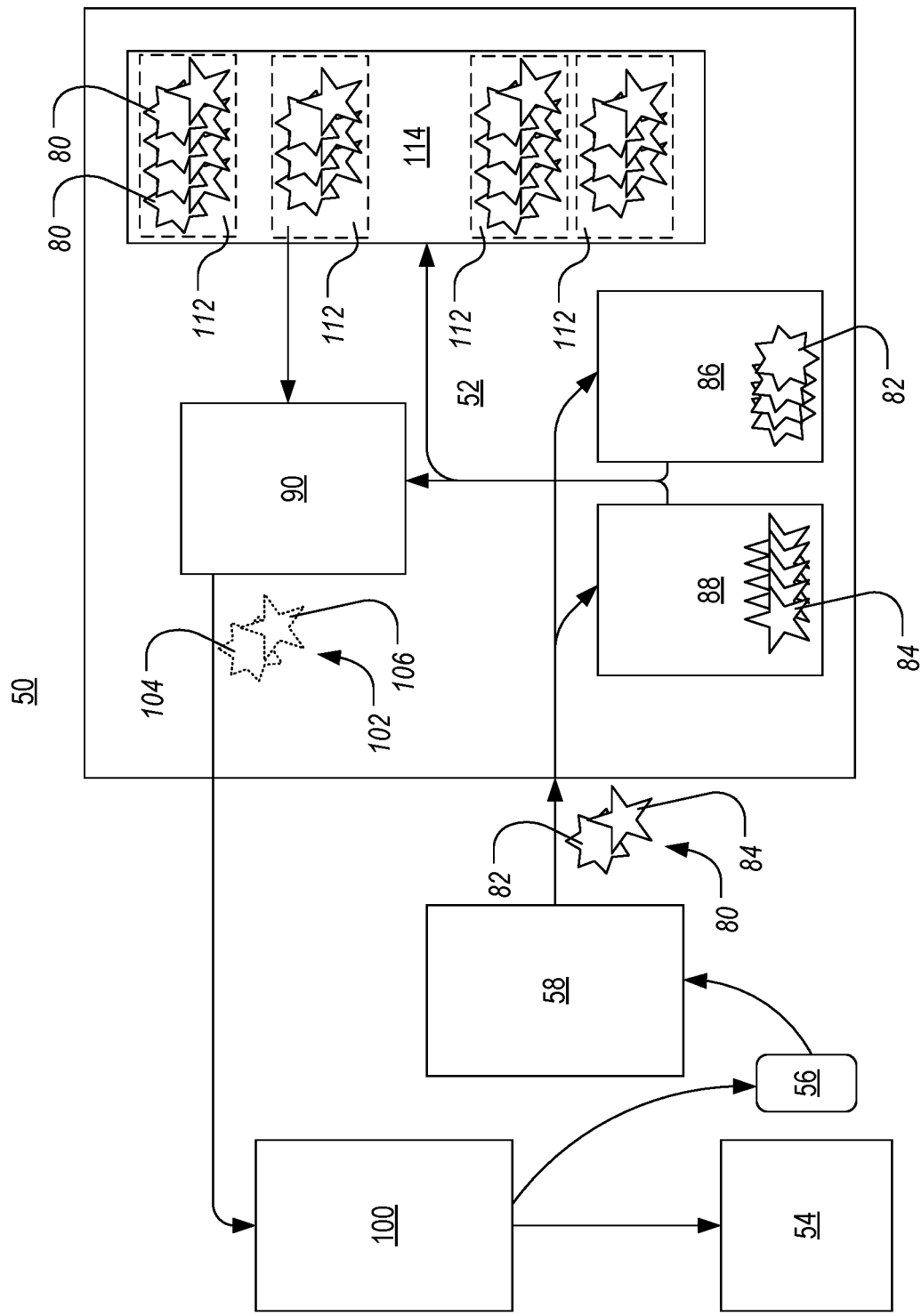

The processing engine 90 need not be limited in its use of the information from the experience profiles 80 to manipulation of the lodging reservation provider's general advertising efforts. Instead, the processing engine 90 may utilize information from the experience profiles 80 to modify the user experience at the website 100. For example, as illustrated in FIG. 11, the processing engine 90 may utilize information available to it from the experience profiles 80 to generate website modifications 102 of the user experience at the website 100 in a manner deemed likely to adjust user behavior in desirable ways. The website modifications 102 may include an online subset 102 and an offline subset 104 based on the online component 82 and the offline component 84 of the experience profiles 80, respectively. Alternatively, there may not be subsets of instructions directly divisible by attribution to individual sources of information. Nevertheless, by way of example, the website modifications 102 made by the processing engine 90 may present different lodging options to certain users, may adjust layout or presentation of materials, and may adjust the information that is displayed. By way of further example, the processing engine 90 may modify when or how a call-in telephone number is displayed to make most use of the resources of the call center and/or to maximize the chances of conversion of a reservation or sale. As another example, if the processing engine 90 determines that a particular user will be most likely to place a reservation by using the call center, the processing engine may modify the website to encourage the user to call in to the call center earlier in the process of browsing the website 100.

As modifications are implemented to advertising (FIG. 10) and to the website (FIG. 11), the processing engine 90 may monitor and keep track of associated changes in click-through and conversion rates. Accordingly, over time the processing engine 90 may accumulate information allowing it to quantify the effects of certain changes to the system's advertising efforts and/or website changes in an A-to-B fashion. Accordingly, as changes A are implemented, the processing engine 90 will learn and know that certain results B are to be expected and can improve change-related performance over time.

Figure 12:
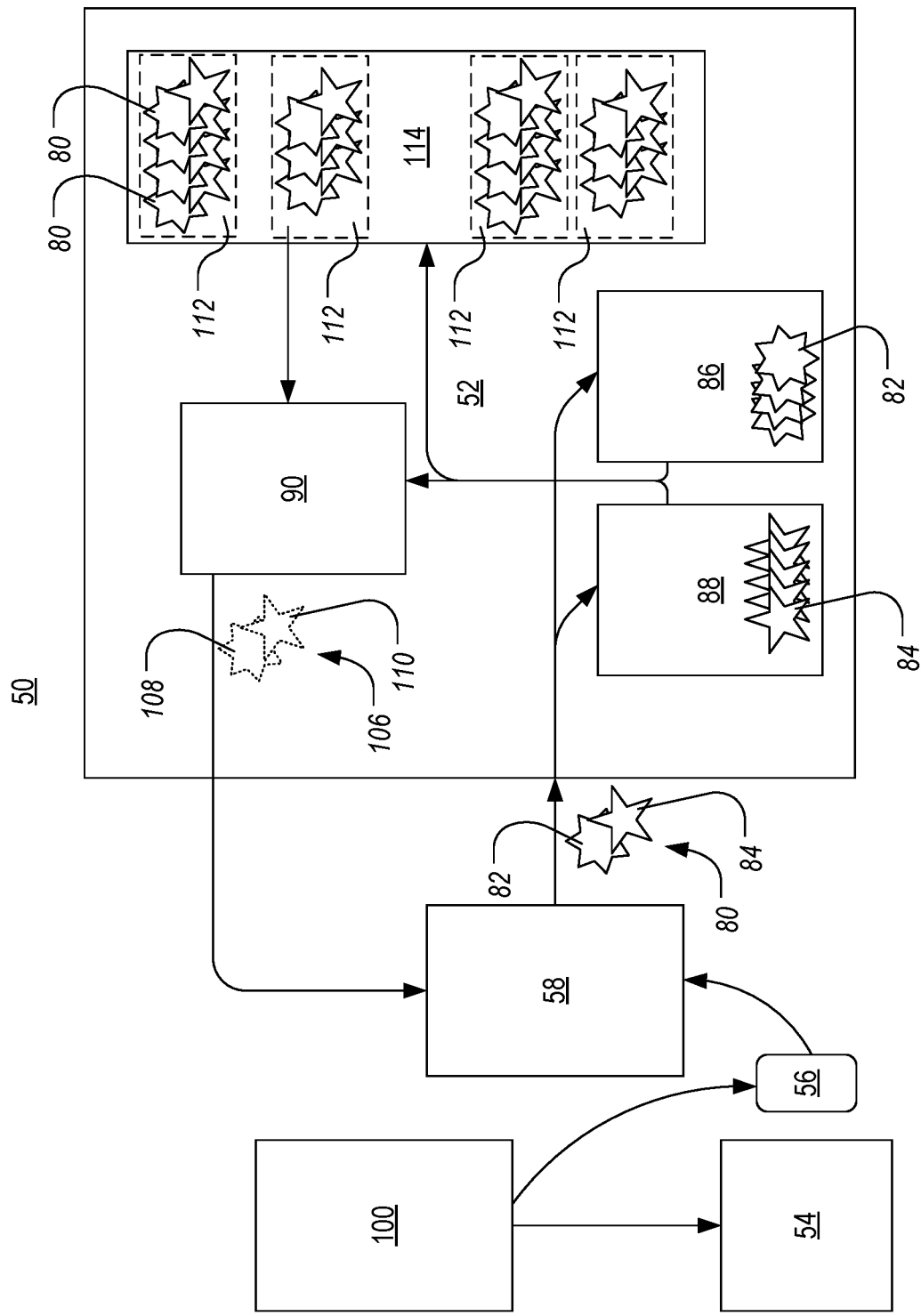

The processing engine 90 may also utilize the information from the experience profiles 80 to modify information and/or instructions sent to the call center system 58. For example, as illustrated in FIG. 12, the processing engine may utilize information available to it from the experience profiles 80 to provide certain information and instructions (collectively call center instructions 106) to the call center 58 to be used in handling incoming calls (as discussed previously). The call center instructions 106 may include an online component 108 derived from the online component 82 of the experience profiles 80. The call center instructions 106 may also include an offline component 110 derived from the offline component 84 of the experience profiles 80. As may be understood, individual instructions of the call center instructions 106 may not be readily attributable to any specific component of any particular experience profile, especially where machine learning has been utilized in a system including a neural network or an artificial intelligence. Accordingly, the depictions of FIGS. 10-12 should be understood as illustrating principles of the embodiments of the invention, and not to require any specific makeup of any instructions, information, or modifications.

The call center instructions 106 may include a variety of instructions to the call center system 58. By way of example, the call center instructions 106 may include instructions for a certain call center representative to handle a call, if possible. In other words, the processing engine 90 (e.g., the neural network or artificial intelligence) may predict which agent will work best with a particular customer and may instruct the call center system 58 to have that agent handle the incoming call. The call center instructions 106 may also include instructions relating to scripts and/or dialog that should be used by the call center agent, as will be discussed in more detail subsequently.

In certain embodiments of the system, the processing engine 90 may separately utilize two individual sets of experience profiles 80. The first sets of experience profiles 80 that may be utilized by the processing engine 90 are the set of all available experience profiles 80. This set may allow the server system 52 to modify advertising efforts, modify website presentation, and modify call center instructions in a manner intended to maximize effectiveness of advertising, the website, and the call center for all general users.

The processing engine 90 may also utilize a second group of sets of experience profiles 80 to further improve effectiveness of the system with respect to individual users. The system may utilize a variety of information to detect returning users and to customize the experience of returning users to improve user experience, to improve click-through, and to improve individual customer conversion rates. Accordingly, where the system is able to detect a returning user, the processing engine 90 may utilize or favor accumulated experience profiles 80 relating to that specific user. Accordingly, as illustrated in FIGS. 10-12, the system may be configured to accumulate each of the individual experience profiles 80 for each consumer (including both any accompanying online components 82 and any accompanying offline components 84) into individual user profiles 112, which may be stored on a user profile database 114.

As users continue to interact with the system, the number of experience profiles 80 stored by the system for such users will increase, and the processing engine 90 will be able to better and better customize the experience for such users. Some user profiles 112 may become particularly robust. By way of example, the online advertisements presented to certain users may be customized to appeal to interests of those users. Similarly, when users arrive at the website 100, they may be presented with opportunities to travel to locations known to be of interest to such users. By way of a specific example, if the experience profiles 80 stored in the user profile 112 for a particular user indicate that the user books travel on a monthly basis to a particular location, such as for work or to visit family, the system may present an opportunity to book such travel at an appropriate time in advertisements or on the website 100. Similarly, if the experience profiles 80 indicate that the user has repeatedly looked at options for travel to a particular location but has not yet booked reservations (e.g. flights, hotel, etc.) relating to such travel, the system may automatically present options relating to such travel to the user on a future visit.

Accordingly, as illustrated in FIG. 10, an individual user profile 112 may be used to modify or customize advertising efforts in relation to certain individual users, or even with respect to general users or users expected to be similarly situated. For example, the server system 52 or the system of the advertising partner 98 may utilize cookies and other methods to keep track of information such as individual users' locations, browsing histories, and the like, and may utilize such information to customize the advertising presented to such users on the basis that they are similarly situated to the user of the user profile 112 being referenced.

Additionally, as illustrated in FIG. 11, an individual user profile 112 may be used to modify or customize the website 100 presented to that user in the manner discussed above. Furthermore, referring again to FIG. 11, an individual user profile 112 may also be used to modify or customize the website 100 presented to other users generally in accordance with a variety of considerations. For example, the website 100 may be modified or customized in accordance with the information from an individual user profile 112 when the processing engine 90 determines that the user of the website 100 is similarly situated to the user of the user profile 112. Such may be the case based on, for example, user location, search terms, advertising campaign that resulted in click-through, browsing history contained in certain cookies, and the like.

Furthermore, as illustrated in FIG. 12, an individual user profile 112 may be used to modify or customize the user experience with the call center. Such may be the case with respect to individual returning users, as well as with respect to other similarly situated users. With respect to similarly situated users, the modifications may be undertaken in accordance with the factors discussed previously. With respect to returning users, the user profile 112 may be particularly helpful in facilitating the user's interactions with the call center agent. Initially, the incoming call may be handled according to instructions provided by the processing engine 90 to the call center system 58. By way of example, the call may be directed, if possible, to an agent with whom the returning user has dealt in the past, and who has shown rapport with the user, or who has shown an ability to close the reservation/sale with the user.

After the call is answered, the call center agent may be provided with a script and/or information to be used to direct the call with the user. By way of example, the user's most-recent experience profile 80 (or information therefrom) may be referenced and used by the call center agent to initiate a conversation with the user, along the lines of "I see you may be interested in travelling to Paris. How may I help you with your travel plans."

In some embodiments, the system may be configured to walk back through the user's most-recent experience profiles 80 in a time-based fashion if a negative response is received from the user. In the example above, if the user indicates he is not interested in travel to Paris, the agent could be presented with information from an immediately prior experience profile 80 relating to searching for travel to Washington, D.C. and could ask about that. If a further negative response were received, the agent could reference information from the next prior experience profile 80 to attend to the user's needs. Accordingly, embodiments of the system provide methods by which the user call-in experience may be improved and facilitated to maximize closing rates.

Embodiments of the system may utilize a variety of systems to determine when a user calling in to a call center relates to available experience profiles 80 or user profiles 112. As discussed previously, information relating to the user's online interactions may be used to associate the user with the experience profiles 80 or user profiles 112. Such information may include cookies, the call-in number used by the user, the associated identifier of the user embedded in the incoming call to permit early release of the call-in number, as well as information provided by third parties, such as Google click-to-call information provided by Google. In some embodiments, online presence information may extend to related information such as an email address, social media profiles, and the like, and the processing engine 90 may access and/or use such additional information in generating and accessing user profiles 112 and/or in using the user profiles 112 and experience profiles 80 in the advertising (FIG. 10), website modifications (FIG. 11), or call center experience (FIG. 12) of the users.

Furthermore, in some embodiments, the system may be adapted to access and provide information even in situations where a call to the call center is received without an online interaction first. By way of example, the system may user caller ID or automatic number identification (ANI) information to identify an incoming call. The system may then use information already on store with respect to the number to identify the user, or may utilize a paid external information vendor provide information on the fly to identify or provide information about the user making the incoming call so that the user's experience may be customized either by linking the experience to a correct user profile or by identifying similarly-situated individuals, or simply for use in adjusting future interactions (e.g., for continual use by the system in adjusting marketing efforts).

While embodiments of the invention have been discussed relative to the travel industry, it should be understood that embodiments of the invention may be adapted to any industry or system that utilizes a call center to process incoming customer calls. For example, embodiments of the invention may be utilized in the insurance industry. Embodiments of the invention may also be utilized to provide software-as-a-service offerings.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A system for client relation management comprising a server system configured to:
   serve web pages relating to sale of a product or service, the web pages each including a call-in number, each call-in number being uniquely assigned to a served web page served to a first end user for a period of time before being released for use in being served to a served web page served to a second end user;
   associate user website activity of the first end user with a first call-in number in a first data structure maintained by the server system;
   associate user web site activity of the second end user with the first call-in number in a second data structure maintained by the server;
   receive notification of receipt of a call to the first call-in number;
   deliver the first data structure and the second data structure to a call center representative handling the call to the first call-in number, such that the representative can correctly identify whether a caller to the first call-in number is the first end user or the second end user; and
   associate the caller with the appropriate data structure among the first data structure and the second data structure.

2. The system as recited in claim 1, wherein the first data structure and the second data structure are two of a plurality of data structures maintained by the system associated with the first call-in number and wherein the system is configured to provide more than two data structures to the call center representative for identification of the appropriate data structure.

3. The system as recited in claim 1, wherein the server system is configured to receive information relating to an automatic number identification (ANI) of the call to the first call-in number and to use the information relating to the ANI of the call to select among available data structures for delivery to the call center representative.

4. The system as recited in claim 1, wherein the server system is configured to receive information relating to a geographical location of the caller to the first call-in number and to use the information relating to the geographical location of the caller to select among available data structures for delivery to the call center representative.

5. The system as recited in claim 1, wherein the server system is configured to use the association of the caller with the appropriate data structure to link the call to the first call-in number to an online advertising campaign.

6. The system of claim 1, wherein the server system is configured to receive timing information of a plurality of calls made using the first call-in number and to select among available data structures for delivery to the call center representative based in part on the timing information of the plurality of calls.

7. The system of claim 1, wherein the server system is configured to:
   determine a first likelihood of a match between the first data structure and the caller; and
   determine a second likelihood of a match between the second data structure and the caller,
   wherein delivering the first data structure and the second data structure to the call center representative includes providing the first data structure and the second data structure in an order based on the determined first likelihood and second likelihood.

8. The system of claim 1, wherein the system is configured to:
receive information relating to a geographical location of the caller to the first call-in number,
wherein associating the caller with the appropriate data structure includes compare browsing location information contained within the first data structure and the second data structure with the received geographic location.

9. A method for client relation management comprising:
serving web pages relating to sale of a product or service, the web pages each including a call-in number, each call-in number being uniquely assigned to a served web page served to a first end user for a period of time before being released for use in being served to a served web page served to a second end user;
associating user website activity of the first end user with a first call-in number in a first data structure maintained by the server system;
associating user website activity of the second end user with the first call-in number in a second data structure maintained by the server;
receiving notification of receipt of a call to the first call-in number;
delivering the first data structure and the second data structure to a call center representative handling the call to the first call-in number, such that the representative can correctly identify whether a caller to the first call-in number is the first end user or the second end user; and
associating the caller with the appropriate data structure among the first data structure and the second data structure.

10. The method as recited in claim 9, wherein the first data structure and the second data structure are two of a plurality of data structures maintained by the system associated with the first call-in number and wherein the method further comprises providing more than two data structures to the call center representative for identification of the appropriate data structure.

11. The method as recited in claim 9, wherein the method comprises receiving information relating to an automatic number identification (ANI) of the call to the first call-in number and using the information relating to the ANI of the call to select among available data structures for delivery to the call center representative.

12. The method as recited in claim 9, wherein the method further comprises receiving information relating to a geographical location of the caller to the first call-in number and using the information relating to the geographical location of the caller to select among available data structures for delivery to the call center representative.

13. The method as recited in claim 9, wherein the method further comprises using the association of the caller with the appropriate data structure to link the call to the first call-in number to an online advertising campaign.

14. The method of claim 9, further comprising receiving timing information of a plurality of calls made using the first call-in number and to select among available data structures for delivery to the call center representative based in part on the timing information of the plurality of calls.

15. The method of claim 9, further comprising:
determine a first likelihood of a match between the first data structure and the caller; and
determine a second likelihood of a match between the second data structure and the caller,
wherein delivering the first data structure and the second data structure to the call center representative includes providing the first data structure and the second data structure in an order based on the determined first likelihood and second likelihood.

16. The method of claim 9, further comprising:
receiving information relating to a geographical location of the caller to the first call-in number,
wherein associating the caller with the appropriate data structure includes compare browsing location information contained within the first data structure and the second data structure with the received geographic location.

17. A non-transitory computer readable medium having instructions thereon that, when executed by one or more processors, causes a computing system to:
serve web pages relating to sale of a product or service, the web pages each including a call-in number, each call-in number being uniquely assigned to a served web page served to a first end user for a period of time before being released for use in being served to a served web page served to a second end user;
associate user website activity of the first end user with a first call-in number in a first data structure maintained by the server system;
associate user web site activity of the second end user with the first call-in number in a second data structure maintained by the server;
receive notification of receipt of a call to the first call-in number;
deliver the first data structure and the second data structure to a call center representative handling the call to the first call-in number, such that the representative can correctly identify whether a caller to the first call-in number is the first end user or the second end user; and
associate the caller with the appropriate data structure among the first data structure and the second data structure.

18. The non-transitory computer readable medium of claim 17, wherein the first data structure and the second data structure are two of a plurality of data structures maintained by the system associated with the first call-in number and wherein the method further comprises providing more than two data structures to the call center representative for identification of the appropriate data structure.

19. The non-transitory computer readable medium of claim 17, wherein the instructions, when executed by the one or more processors, further causes the computing system to receive information relating to an automatic number identification (ANI) of the call to the first call-in number and using the information relating to the ANI of the call to select among available data structures for delivery to the call center representative.

20. The non-transitory computer readable medium of claim 17, wherein the instructions, when executed by the one or more processors, further causes the computing system to receive information relating to a geographical location of the caller to the first call-in number and using the information relating to the geographical location of the caller to select among available data structures for delivery to the call center representative.

21. The non-transitory computer readable medium of claim 17, wherein the instructions, when executed by the one or more processors, further causes the computing system to use the association of the caller with the appropriate data structure to link the call to the first call-in number to an online advertising campaign.

22. The non-transitory computer readable medium of claim 17, wherein the instructions, when executed by the one or more processors, further cause the computing system to:
   determine a first likelihood of a match between the first data structure and the caller; and
   determine a second likelihood of a match between the second data structure and the caller,
   wherein delivering the first data structure and the second data structure to the call center representative includes providing the first data structure and the second data structure in an order based on the determined first likelihood and second likelihood.

23. The non-transitory computer readable medium of claim 17, wherein the instructions, when executed by the one or more processors, further cause the computing system to:
   receive information relating to a geographical location of the caller to the first call-in number,
   wherein associating the caller with the appropriate data structure includes compare browsing location information contained within the first data structure and the second data structure with the received geographic location.

\* \* \* \* \*